US009836839B2

(12) United States Patent
Champlin et al.

(10) Patent No.: US 9,836,839 B2
(45) Date of Patent: Dec. 5, 2017

(54) IMAGE ANALYSIS SYSTEMS AND RELATED METHODS

(71) Applicant: Tokitae LLC, Bellevue, WA (US)

(72) Inventors: Cary Richard Champlin, Bellevue, WA (US); Charles Delahunt, Seattle, WA (US); Matthew P. Horning, Redmond, WA (US); Liming Hu, Kent, WA (US); Shawn Keith McGuire, Seattle, WA (US); Courosh Mehanian, Redmond, WA (US); Clay Matthew Thompson, Camano Island, WA (US); Benjamin K. Wilson, Kirkland, WA (US)

(73) Assignee: TOKITAE LLC, Bellevue, WA (US)

( * ) Notice: Subject to any disclaimer, the term of this patent is extended or adjusted under 35 U.S.C. 154(b) by 20 days.

(21) Appl. No.: 15/154,824

(22) Filed: May 13, 2016

(65) Prior Publication Data
US 2016/0350914 A1    Dec. 1, 2016

Related U.S. Application Data

(60) Provisional application No. 62/167,452, filed on May 28, 2015.

(51) Int. Cl.
*G06K 9/00* (2006.01)
*G06T 7/00* (2017.01)
*G06K 9/46* (2006.01)

(52) U.S. Cl.
CPC ........ *G06T 7/0012* (2013.01); *G06K 9/00147* (2013.01); *G06K 9/4652* (2013.01); *G06T 2207/30004* (2013.01)

(58) Field of Classification Search
CPC combination set(s) only.
See application file for complete search history.

(56) References Cited

U.S. PATENT DOCUMENTS

| 7,706,606 B1 * | 4/2010 | Ruzon ................. H04N 1/40012 382/162 |
| 8,103,102 B2 | 1/2012 | Chien et al. |
| 8,326,084 B1 | 12/2012 | Marrion, Jr. et al. |
| 8,760,756 B2 | 6/2014 | Price et al. |
| 8,768,065 B2 | 7/2014 | Melikian |

(Continued)

OTHER PUBLICATIONS

Harvey et al.; "Comparison of GENIE and Conventional Supervised Classifiers for Multispectral Image Feature Extraction"; IEEE Transactions on Geoscience and Remote Sensing; Feb. 2002; pp. 393-404; vol. 40, No. 2.

(Continued)

*Primary Examiner* — Alex Liew
(74) *Attorney, Agent, or Firm* — Dorsey & Whitney LLP

(57) ABSTRACT

Embodiments disclosed herein are directed to systems and methods for determining a presence and an amount of an analyte in a biological sample. The systems and methods for determining the presence of an analyte utilize a plurality of images of a sample slide including multiple fields-of-view having multiple focal planes therein. The systems and methods utilize algorithms configured to color and grayscale intensity balance the plurality of images and based thereon determine if the plurality of images contain the analyte therein.

53 Claims, 15 Drawing Sheets

(56) References Cited

U.S. PATENT DOCUMENTS

| | | | |
|---|---|---|---|
| 2012/0002871 A1* | 1/2012 | Hu | G06T 7/529 |
| | | | 382/164 |
| 2012/0207360 A1 | 8/2012 | Mehanian et al. | |
| 2013/0100272 A1 | 4/2013 | Price et al. | |
| 2013/0267032 A1* | 10/2013 | Tsai | G01N 21/78 |
| | | | 436/95 |
| 2015/0186755 A1 | 7/2015 | Mehanian et al. | |
| 2015/0211987 A1* | 7/2015 | Burg | G01N 35/00029 |
| | | | 356/402 |

OTHER PUBLICATIONS

Krizhevsky et al.; "ImageNet Classification with Deep Convolutional Neural Networks"; 2012; pp. 1-9; last accessed on May 19, 2016.

PCT International Search Report; International App. No. PCT/US2016/034050; dated Sep. 19, 2016; pp. 1-3.

Krizhevsky et al,; Imagenet classification with Deep Convolutional Neural Networks, In Advances in Neural Information Processing. (http://www.cs.toronto.edu/~fr Systems (NIPS 2012) (9 pages).

Linder et al.; "A Malaria Diagnostic Tool Based on Computer Vision Screening and Visualization of Plasmodium falciparum Candidate Areas in Digitized Blood Smears" PLOS ONE, www.plosone.org, Aug. 2014, vol. 9, Issue 8.

Tek et al., "Computer vision for microscopy diagnosis of malaria" Malaria Journal 2009, 8:153, http://www.malariajournal.com/content/8/1/153 (14 pages).

Wikipedia; Author Unknown; Comparison Chromatic Focus Shift Plts, Apochromat, (2 pages) retrieved on May 13, 2016. https://en.wikipedia.org/wiki/Apochromat.

* cited by examiner

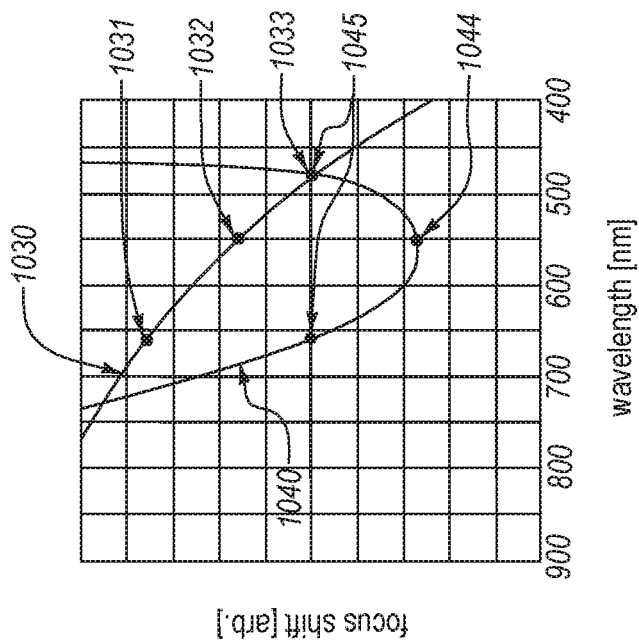
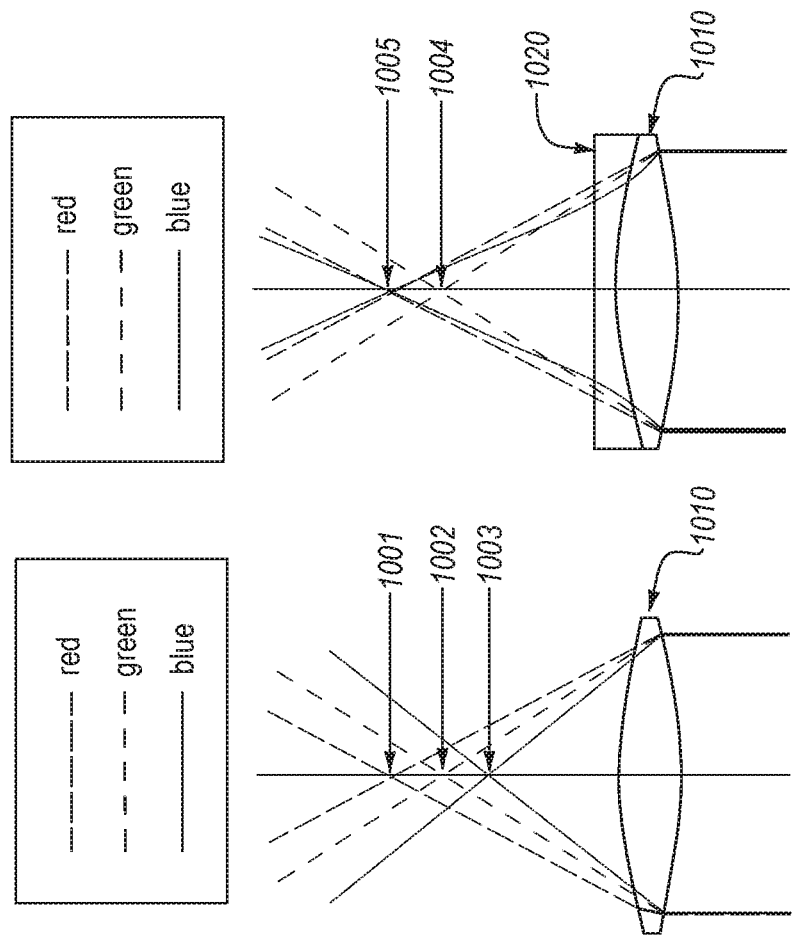
FIG. 10C
FIG. 10B
FIG. 10A

IMAGE ANALYSIS SYSTEMS AND RELATED METHODS

If an Application Data Sheet (ADS) has been filed on the filing date of this application, it is incorporated by reference herein. Any applications claimed on the ADS for priority under 35 U.S.C. §§119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 U.S.C. §119(e) for provisional patent applications, for any and all parent, grandparent, great-grandparent, etc. applications of the Priority Application(s)).

PRIORITY APPLICATIONS

U.S. Provisional Patent Application No. 62/167,452 filed May 28, 2015.

If the listings of applications provided above are inconsistent with the listings provided via an ADS, it is the intent of the Applicant to claim priority to each application that appears in the Domestic Benefit/National Stage Information section of the ADS and to each application that appears in the Priority Applications section of this application.

All subject matter of the Priority Applications and of any and all applications related to the Priority Applications by priority claims (directly or indirectly), including any priority claims made and subject matter incorporated by reference therein as of the filing date of the instant application, is incorporated herein by reference to the extent such subject matter is not inconsistent herewith.

BACKGROUND

Microscopy techniques are used to diagnosis several diseases, hematology conditions, etc. Some microscopy techniques require specialized microscopes or other equipment to achieve sufficient resolution for proper diagnoses.

Microscopes can be used to detect analytes such as malaria using a smear, such as a thick blood smear. Typically, the microscope includes an oil immersion lens having a relatively shallow depth of field to achieve resolutions required to detect the parasitic protozoans that cause malaria. The lens typically exhibits a depth of field that is only a few micrometers, about a micrometer, or less than a micrometer. Typically, an entire thickness of a smear is imaged to conclusively diagnose a condition indicated by the presence of the analyte. However, the thickness of the smear is greater than a few micrometers, which can cause problems with diagnosis, depending on the focal plane of the image. To ensure that the entire smear is analyzed, the distance between the sample and the lens can be decreased or increased to capture multiple focal planes of each field-of-view (FoV) in a smear.

A typical microscope includes a conventional focusing system configured to increase or decrease a distance between the lens and the sample in micrometer displacements. However, such a conventional focusing system can be expensive and complex, which makes the conventional focusing systems unsuitable for areas where is malaria is most prevalent, such as in poverty-stricken areas. Typical diagnostic measures include employing a human technician to scan the slide in the microscope to visually determine if the analyte is present. However, factors that limit the sensitivity and consistency of human microscopists include inter- and intra-person variability, inattentiveness, eyestrain, fatigue, and lack of training. Lack of training is especially relevant in low-resource settings, where highly-qualified microscopists can be in short supply compared to the burden of diseases such as malaria. Additionally, human technicians may not be able to identify or quantify particularly low concentrations of an analyte (e.g., low parasitemia) in a sample slide.

Therefore, developers and users of microscopes continue to seek improvements to microscopes and diagnostic techniques for use in determining a presence of analytes.

SUMMARY

Embodiments disclosed herein relate to systems and methods for diagnosing identifying, and quantifying biological analytes in biological samples. In an embodiment, a system for determining the presence of an analyte in blood is disclosed. The system includes at least one memory storage medium configured to store a plurality of images of a sample slide. The plurality of images include a plurality of fields-of-view, each including a unique x and y coordinate of the sample slide; and a plurality of focal planes, each having a unique z coordinate of the sample slide. The system includes at least one processor operably coupled to the at least one memory storage medium. The at least one processor is configured to determine and apply a white balance transform to each of the plurality of images effective to produce a plurality of color-corrected images. The at least one processor is configured to determine and apply an adaptive grayscale transform to each of the plurality of images to provide an adaptive grayscale intensity image for each of the plurality of images. The at least one processor is configured to detect and identify one or more candidate objects in the plurality of color-corrected images and the adaptive grayscale intensity images. The at least one processor is configured to extract and score the one or more candidate objects based at least in part on one or more characteristics of the one or more candidate objects, filter the one or more candidate objects based at least in part on the score, and output one or more color-corrected image patches and one or more adaptive grayscale intensity image patches for each filtered candidate object. The at least one processor is configured to extract one or more feature vectors from the color-corrected image patches and the adaptive grayscale intensity image patches and output the one or more feature vectors. The at least one processor is configured to classify each feature vector as corresponding to an artifact or an analyte. The at least one processor is configured to determine if the feature vectors classified as analytes are above or below a threshold level associated with a positive diagnosis.

In an embodiment, a method of determining the presence of an analyte in blood is disclosed. The method includes receiving a plurality of images of a sample slide. The plurality of images include a plurality of fields-of-view, each including a unique x and y coordinate of the sample slide; and a plurality of focal planes, each having a unique z coordinate of the sample slide. The method includes applying a white balance transform to each of the plurality of images effective to produce a plurality of color-corrected images. The method includes applying an adaptive grayscale transform to each of the plurality of images to provide an adaptive grayscale intensity image for each of the plurality of images. The method includes detecting and identifying one or more candidate objects in the plurality of color-corrected images and the adaptive grayscale intensity images. The method includes filtering the one or more candidate objects based at least in part on a score that is based at least in part on one or more characteristics thereof and outputting one or more color-corrected image patches and one or more adaptive grayscale intensity image patches for each filtered candidate object. The method includes extracting one or more feature vectors from the color-corrected image patches and the adaptive grayscale intensity image patches and outputting the one or more feature vectors. The method includes classifying each feature vector as corresponding to an artifact or an analyte. The method includes determining if the feature vectors classified as analytes are above or below a threshold level associated with a positive diagnosis.

In an embodiment, a system for determining the presence of a malaria parasite in blood is disclosed. The system includes a microscope configured to capture a plurality of images of a blood slide. Each of the plurality of images includes a plurality of fields-of-view, each including a unique x and y coordinate of the blood slide; and a plurality of focal planes, each having a unique z coordinate of the blood slide. The system includes at least one memory storage medium configured to store the plurality of images of the blood slide. The system includes at least one processor operably coupled to the at least one memory storage medium. The at least one processor is configured to determine and apply a white balance transform to each of the plurality of images effective to produce a plurality of color-corrected images. The at least one processor is configured to determine and apply an adaptive grayscale transform to each of the plurality of images to provide an adaptive grayscale intensity image for each of the plurality of images. The at least one processor is configured to detect and identify one or more candidate objects in the plurality of color-corrected images and the adaptive grayscale intensity images. The at least one processor is configured to extract and score one or more characteristics of the one or more candidate objects, filter the one or more candidate objects based at least in part on the score. The at least one processor is configured to extract color-corrected image patches and adaptive grayscale intensity image patches of the one or more filtered candidate objects and output one or more feature vectors for each filtered candidate object. The at least one processor is configured to classify each feature vector as an artifact or an analyte. The at least one processor is configured to determine if the feature vectors classified as analytes are above or below a threshold level associated with a positive diagnosis.

Features from any of the disclosed embodiments can be used in combination with one another, without limitation. In addition, other features and advantages of the present disclosure will become apparent to those of ordinary skill in the art through consideration of the following detailed description and the accompanying drawings.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIGS. 10A and 10B are illustrations of light rays being refracted to different focal planes through a simple lens and a lens with an achromatic correction, respectively.

FIG. 10C is a graph of focus versus wavelength curves for the simple lens and lens with an achromatic correction shown in FIGS. 10A and 10B.

DETAILED DESCRIPTION

Figure 1:
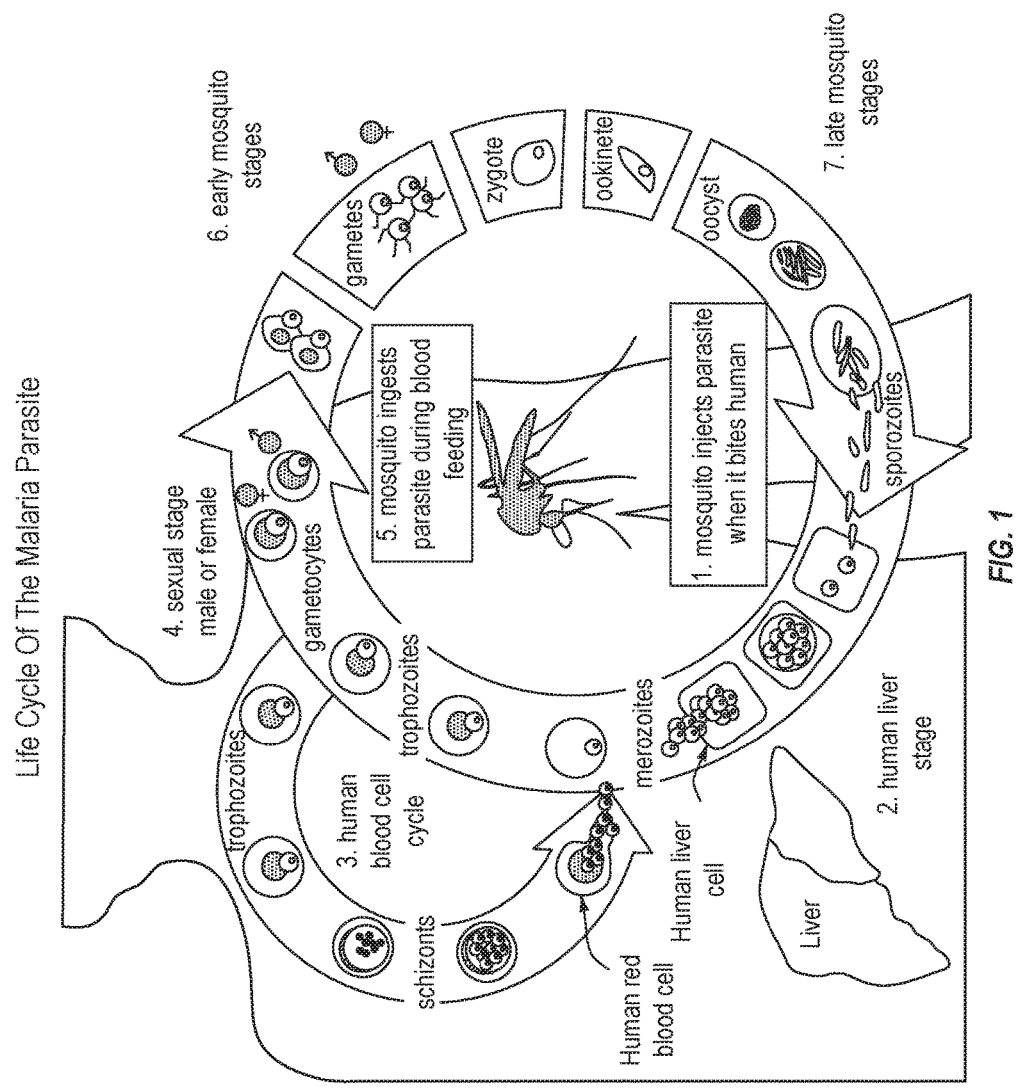
FIG. 1 is a diagram of the malaria life cycle.

Embodiments disclosed herein relate to image analysis systems, and methods of using the same. The images disclosed herein include images in any computer readable format, such as png, jpeg, gif, tiff, bmp, or any other suitable file type. The image analysis systems and related methods herein can resolve and analyze images throughout an entire vertical thickness (e.g., substantially parallel to an optical or z-axis on a microscope) and lateral sections (e.g., x and y axis based dimensions) of a sample smear (e.g., a thick blood smear) on a slide. The systems and methods herein can identify objects in different focal planes (z-levels) that are in fact the same object, but which appear different due to differing focal depth or which have different x-y coordinates due to camera jitter. As explained in more detail below, the blood smear can be analyzed using multiple fields-of-view (FoVs) defining discrete lateral (sub)sections of the blood smear and multiple focal planes defining discrete (vertically) stacked) planes throughout the thickness of the blood smear. The image analysis systems herein can accurately identify a presence and, in some embodiments, species or stages of parasite(s) or other analytes in a sample. The systems and methods disclosed herein can provide one or more of automatic diagnosis and of quantification of one or more analytes in biological specimens at a performance level equal to or better than a highly-trained human microscopist. As used herein, the term "analyte" is not intended to be limited to a specific chemical species, but is intended to extend at least to one or more of parasites (e.g., malaria, etc.), blood components, or other objects in a sample for which an analysis is carried out. The systems and methods disclosed herein provide a comprehensive machine learning framework, which uses computer vision and machine learning techniques including support vector machines (SVMs) and convolutional neural networks (CNNs) to detect analytes.

The image analysis systems and related methods herein include a plurality of modules (e.g., programs or algorithms) configured to carry out different functions to accurately determine a presence of an infection or a condition in a sample even at low concentrations (e.g., low parasitemia) and without the need for human observation. The plurality of modules can include a preprocessing module, a candidate detection module, a feature extraction module, a classification module, and a diagnosis module. While described herein as individual "modules" for clarity, each of the "modules" can be one or more algorithms, or machine-readable programs based on the same, stored in at least one memory storage device and can be executable by a processor operably coupled thereto. The plurality of modules can include discrete programming modules and submodules stored in the memory storage medium of at least one controller (e.g., computer) or in one or more processors therein each having programming configured to carry out the functions of the related modules.

Generally, each module is configured to cause the controller or processor to perform the functions described below. While a high level overview of the functions are described generally immediately below for ease of understanding, specific aspects of each module are disclosed in more detail below.

The image preprocessing module can generate adaptively white balanced color images and adaptive grayscale intensity images of multiple images, including multiple FoVs and a plurality of focal planes (e.g., each of the plurality of focal planes being substantially perpendicular to the optical axis) of a sample slide. The candidate detection module can identify one or more candidate objects based at least in part on one or more attributes of candidate objects in the images (e.g., intensity, color type, level of focus, or other attributes), identify and exclude one or more artifacts (e.g., non-analyte objects such as non-parasitic objects including white blood cells in the sample) based on the same, and can extract color-corrected image patches and adaptive grayscale intensity image patches containing each candidate object. The feature extraction module can identify and output one or more data sets of the candidate object(s) in the specific image (e.g., one or more vectors of a specific FoV and focal plane thereof). The feature extraction module can base said identification on manual features including one or more of best focus score of the candidate object, the standard deviation (or other measure of dispersion) of the focus score across the focal planes in a FoV, or a red-shift score. The feature extraction module can additionally or alternatively identify and output one or more images based at least in part on one or more automatic features including computer-learned characteristics (e.g., one or more vectors learned by a convolutional neural network) of positive samples, negative samples, or both. The classification module can be configured to determine if the extracted features have high probability scores (indicating that an analyte or artifact is present) based at least in part on weights learned from known positive and negative samples (e.g., including presence, type, stage, or species of a parasite) and determine an estimate of the concentration of the analyte (e.g., the parasitemia) in the sample.

The following mathematical notations will be used in the equations used in the algorithms disclosed throughout this disclosure. A lowercase or uppercase letter in italics represents a scalar value (e.g., k). A lower case letter in bold italics represents a column vector (e.g., $\xi$). An uppercase letter in bold italics represents a matrix (e.g., A). The superscript T stands for the matrix transpose, (e.g., $\xi^T$). Image plane coordinates are referred to as $(x, y)$, and coordinates in the vertical direction, that is, parallel to the optical axis are referred to as $(z)$.

The image analysis system of the present disclosure receives as input a series of images of a biological specimen acquired from a high-resolution image capture device (e.g., high-resolution microscope), and produces as output, diagnostic information about the status of the biological specimen with respect to the presence, species, and count of one or more analytes (e.g., disease agents such as parasites or naturally-occurring components such as blood components).

In an embodiment, the biological specimen includes a microscope slide of a sample (e.g., a blood smear) and the image analysis system herein analyzes one or more acquired sample slide images to determine the presence or absence of one or more analytes (e.g., malaria parasites) therein. The image analysis system herein analyzes sample slides for the presence, count, and species identification of an analyte. While the systems and methods disclosed herein are not limited to use with blood smears, the blood smear will be used throughout this disclosure as an embodiment to illustrate concepts and it should be understood that the disclosure applies to other biological samples without limitation.

In an embodiment, blood smears are stained with Giemsa stain prior to histopathological diagnosis of one or more analytes therein such as malaria. The Giemsa stain is a combination of Methylene blue, Eosin Y, and Azure B; it stains erythrocytes (red blood cells, hereinafter "RBCs") pink and leukocyte nuclei (white blood cells, hereinafter "WBCs") dark magenta. Malaria parasite nuclei will also stain magenta, although not as dark in appearance as leukocyte nuclei. Malaria parasite cytoplasm will stain light to medium blue. While the systems and methods disclosed herein are not limited to detecting malaria, malaria will be used throughout this disclosure as an example embodiment to illustrate concepts and it should be understood that the disclosure applies to other analytes without limitation. Further, other stains and methods of staining may be used which are complementary to the analyte being tested. For example, suitable stains may include a Field stain, Jaswant Singh Bhattacharya (JSB) stain, Leishman stain, etc.

In an embodiment, the systems and methods herein can be used to detect and quantify an amount of an analyte in a sample based at least in part on one or more of shape, color, or size of the analyte. In some embodiments, the analyte can have more than one conformation or appearance. The systems and methods herein can be configured to detect or quantify the one or more conformations, types, or species of analytes. As an example embodiment, human malaria parasites belong to five different species of the genus *Plasmodium: falciparum, vivax, ovale, malariae,* and *knowlesi.*

Individuals of each of these species go through a complex series of stages in their life cycle. At each stage, the parasite takes on a different physical appearance, and the systems and methods herein can detect and identify parasites from each of the five different species.

FIG. 1 is a diagram of the malaria life cycle courtesy of the National Institute of Allergy and Infectious Diseases. The right side of FIG. 1 shows stages in the malaria parasite life cycle that take place within a mosquito. The left side of the figure shows the stages within an infected human. In the mosquito, malaria parasites start out as gametocytes, both male and female. The gametocytes reproduce to form gametes, which eventually develop and multiply into sporozoites. The sporozoites migrate to the mosquito salivary gland. When the mosquito bites a human, the sporozoites enter the bloodstream and travel to the liver and infect hepatocytes (liver cells). The sporozoites multiply into merozoites, rupture liver cells of the infected host, and return to the bloodstream. Individual merozoites infect red blood cells and develop into a ring form, which is an immature trophozoite. The ring form develops into a more mature trophozoite and eventually into a schizont. Each schizont will break apart into multiple merozoites, each of which seeks its own red blood cell to infect. In this way, the asexual portion of the reproductive cycle repeats itself, indicated by the human blood cell cycle shown to the top left of FIG. 1. Some merozoites can develop into gametocytes, which if ingested by a biting mosquito, will continue the parasite life cycle.

The different species have different life cycle durations and, even at the same life cycle stage, distinctive physical appearances. Because the treatment regimens vary between malaria species, it is important to distinguish between them when doing histopathological malaria diagnosis. The systems and methods of the present disclosure can automatically differentiate between the different malaria stages or species (or analytes).

Figure 2A:
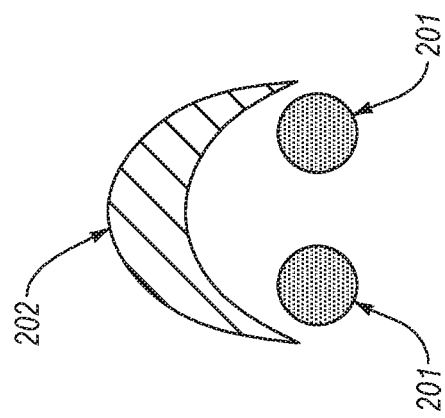
FIGS. 2A and 2B are schematics of ring-form parasites.
Figure 2B:
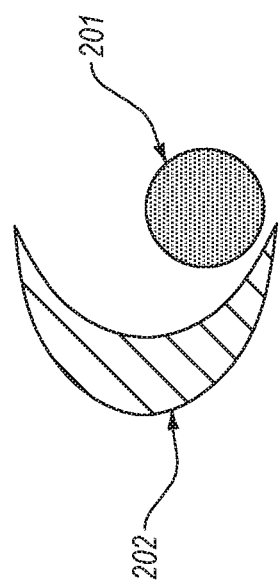

FIGS. 2A and 2B are schematics of ring-form parasites. The ring-form parasite is commonly seen in the peripheral blood. The physical appearance of ring-form parasites varies greatly. The ring-form parasite typically features one (FIG. 2A) or two (FIG. 2B) chromatin dots 201, which contain the parasite's nuclear material. The chromatin dots 201 stain magenta under Giemsa stain as noted above. The ring-form parasite also features a wispy cytoplasm 202, which stains light to medium blue under Giemsa as noted above. The chromatin dots 201 are typically about 1 µm in diameter and the entire ring form under about 3 µm in diameter. The systems and methods herein can be used to identify or quantify analytes that are about 200 nm or larger, such as about 200 nm to about 100 µm, about 500 nm to about 10 µm, about 1 µm to about 5 µm, or less than about 50 µm. In an embodiment, to obtain high-quality images of objects this small, a microscope featuring a high resolution lens is used. For example, a suitable high-resolution microscope can include an oil-immersion 100× objective with a numerical aperture greater than or equal to about 1.2. The microscope can be fitted with a digital image capture device, such as a camera. The depth-of-field of the high-magnification optical systems herein can be about 0.35 µm or less (e.g., 0.3 µm, 0.2 µm, 0.1 µm, or ranges between any of the preceding), whereas blood smears can be several times thicker than this. In embodiments, multiple focal planes are captured for each FoV to capture in-focus images of parasites that can be vertically located anywhere between the bottom and the top of the blood smear. The number of focal planes captured per FoV is designated $n_z$.

Figure 2C:
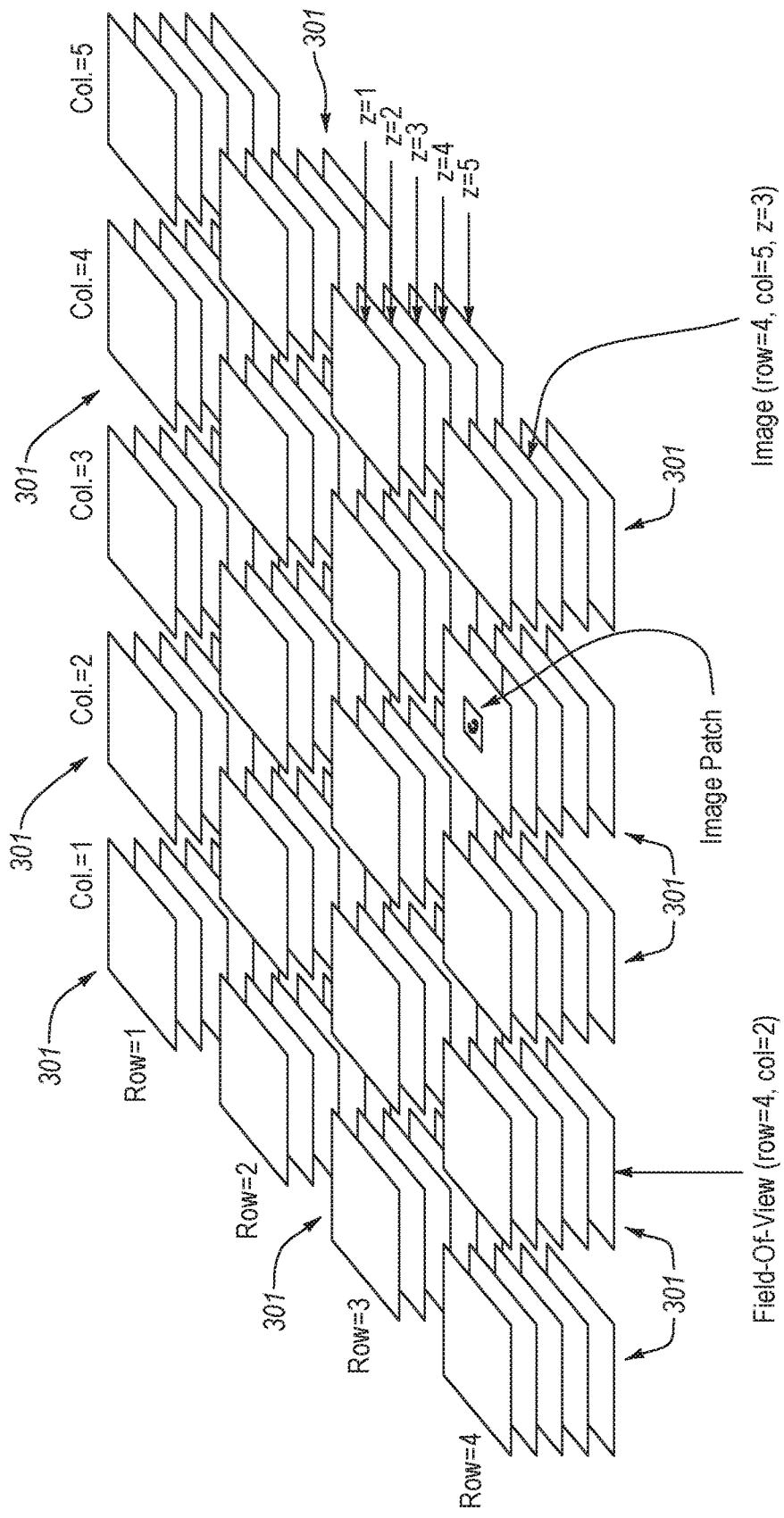
FIG. 2C is a schematic view of a plurality of images, according to an embodiment.

FIG. 2C is a schematic view of a plurality of images 301, according to an embodiment. The plurality of images 301 are arranged in multiple rows and columns. The rows and columns of images collectively define a blood smear or other sample slide. For example, a blood smear may be substantially entirely captured by a plurality of images arranged in a collection of y rows, x columns, and z focal planes. The number of captured FoVs is designated $n_{xy}$. The lateral extent (e.g., x and y extents) of each FOV is limited by one or more the magnification of the lens or the image sensor size of the imaging device. A given size of a blood smear may require a plurality of FoVs to provide suitable image resolution for the purposes herein. Each FoV may have a plurality of focal plane images corresponding thereto. For example, an FoV corresponding to an x,y-coordinate in the plurality of images may include z focal plane images corresponding to the number of focal planes at which the images were captured at the respective FoV. That is, a particular image corresponding to an FoV can be designated by a unique x and y coordinate and the focal plane can be designated by a unique z coordinate in the FoV. Each image (e.g., specific FoV and focal plane) may contain a number of image patches therein. An image patch is a lateral subsection of an FoV (at a specific focal plane) having one or more candidate objects therein and defining an even smaller subsection of the blood slide. The systems and methods disclosed herein utilize pluralities of images consisting of $n_{xy}$ FoVs and $n_z$ focal planes to identify and quantify analytes in samples.

In some embodiments, the size of an FoV captured by the microscopes herein can be on the order of 10,000 µm$^2$ or more, such as 10,000 µm$^2$ to about 20,000 µm$^2$. In some embodiments, the size of an FoV captured by the microscopes herein can be less than about 10,000 µm$^2$, such as 1,000 µm$^2$ to about 10,000 µm$^2$. An FoV of about 10,000 µm$^2$ corresponds to about $3 \times 10^{-4}$ µL of blood in a thick smear blood sample. The number of parasites in an FoV of the blood smear of a malaria patient with a parasitemia of 100 parasites/µL will be Poisson distributed, having, on average, $3 \times 10^{-2}$ parasites per FoV.

In some embodiments, 300 FoVs or more can be captured to achieve sufficient statistics for a reliable detection and count of parasites at low parasitemia. For example, about 300 to 2000 FoVs can be captured or about 500 to 1000 FoVs can be captured. In some embodiments, 300 FoVs or less can be captured to achieve sufficient statistics for a reliable detection and count of parasites at low parasitemia. For example, about 10 to 300 FoVs can be captured or about 50 to 200 FoVs can be captured. The lowest detectable parasitemia level for particular analyte is called the limit-of-detection (LoD). Generally speaking, the larger the number of captured FoVs, the lower will be the LoD.

The foregoing paragraphs provide an overview of the characteristics of the images that serve as input to the image analysis system disclosed herein.

Figure 3A:
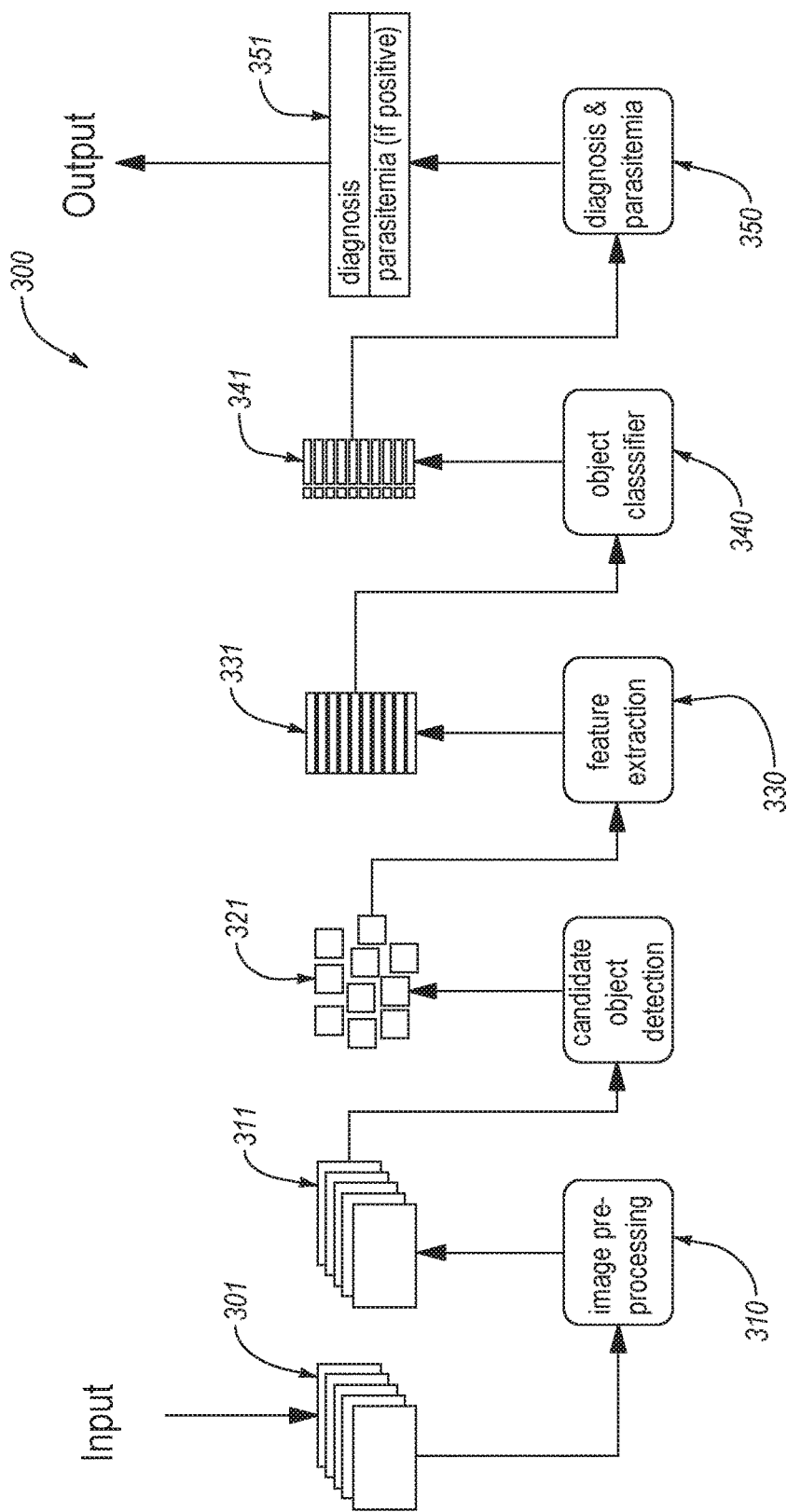
FIG. 3A is a schematic of a plurality of modules of a system to automatically detect and quantify one or more analytes in a sample, according to an embodiment.
Figure 3C:
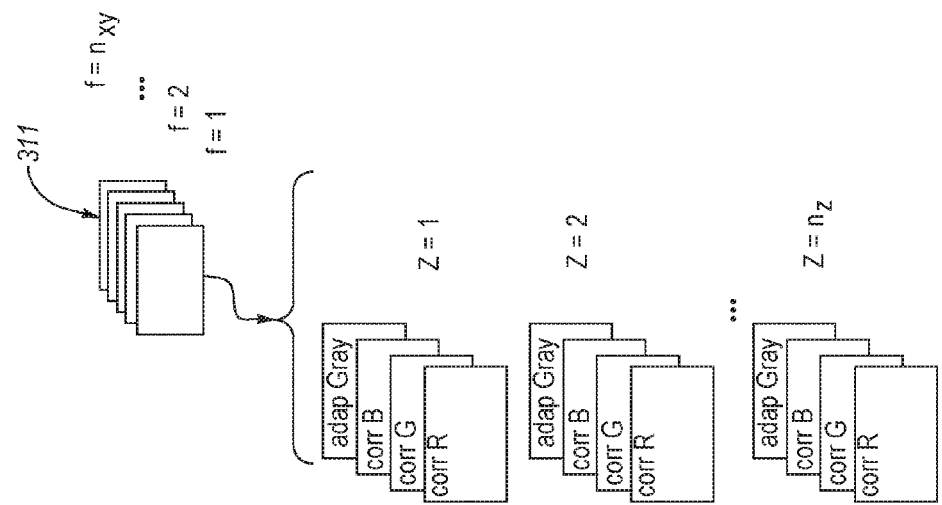
FIGS. 3B and 3C are schematics of a plurality of images input into a module of the system of FIG. 3A, according to an embodiment.
Figure 3B:
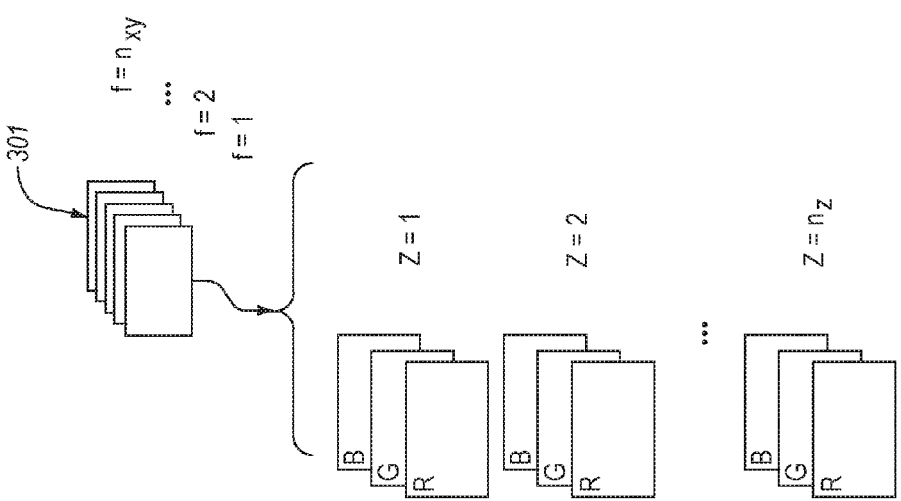

FIG. 3A is a schematic of a plurality of modules of a system 300 to automatically detect and quantify one or more analytes in a sample, according to an embodiment. The modules can be algorithms or controllers including the same (e.g., stored electronically therein) collectively configured to determine the presence of a parasite in a sample. FIGS. 3B and 3C are schematics of a plurality of images 301 input into a module of the system 300 and the output images 311 of the module, respectively.

Referring to FIG. 3A, the one or more modules include an image preprocessing module 310, a candidate object detection module 320, a feature extraction module 330, an object classifier module 340, and a diagnosis module 350. As noted above, the modules and submodules herein can refer to one or more algorithms and machine-readable programs stored in at least one memory storage device (e.g., computer hard-drive) and are executable by at least one processor operably coupled thereto. The modules and submodules described herein can likewise refer to acts in a method of automatically detecting and quantifying one or more analytes in a sample.

An input 301 into the system can include one or more FoV images of a sample slide. There are $n_{xy}$ FoVs each of which includes $n_z$ focal planes, with each focal plane including a red, green, and blue channel images (as shown in FIG. 3B).

In the embodiment shown in FIG. 3A, the system 300 can receive as input the plurality of images 301 at the image pre-processing module 310. The plurality of images 301 can include a plurality of FoVs and a plurality of focal planes for each FoV. The image pre-processing module 310 can output a plurality of output images 311, including color-corrected images and adaptive grayscale intensity images. The plurality of color-corrected images and adaptive grayscale intensity images can be received as input at the candidate object detection module 320 and the feature extraction module 330. The candidate object detection module 320 receives the color-corrected images and adaptive grayscale intensity images and outputs color-corrected R, G, B image patches 321 containing the candidate objects and all $n_z$ focal planes thereof. The feature extraction module 330 receives as input the color-corrected R, G, B image patches 321 (based upon the plurality of color-corrected images and adaptive grayscale intensity images in the output images 311). The feature extraction module 330 extracts and outputs feature vectors 331 of the candidate objects in the color-corrected R, G, B image patches 321, and adaptive grayscale intensity image patches. A feature vector is multidimensional vector of numerical features that represent an object. In other terms, a feature vector is a vector representation including one or more variables that describe one or more characteristics (e.g., color, size, position, etc.) of the object. The object classifier 340 receives the feature vectors 331 as input and outputs classified object data 341 corresponding to the classification of each candidate object as an analyte or artifact. The classified object data is received as input at the diagnosis module 350, which determines and provides a diagnosis for the sample. The diagnosis module can output a diagnosis 351 and a relative concentration of the analyte (e.g., parasitemia). Each of the image analysis system modules 310, 320, 330, 340, and 350 are described in detail below.

A. Image Preprocessing Module

Microscope slides that are histologically stained (e.g., with Giemsa stain) typically display color variation within a slide (intra-slide) and between slides from different specimens (inter-slide). This color variation can result from differences in the pH of the stain and the duration of the staining procedure. Uncorrected, these color differences can degrade the performance of an image analysis system whose purpose is to detect and classify objects of interest in the images.

White balancing techniques can be used to standardize colors in an image. A white balance technique can compute a linear color transform as follows. The average color of the brightest pixels in an image is computed and represented as a red-green-blue column vector:

$$\bar{\xi} \overset{def}{=} \begin{bmatrix} \bar{R} \\ \bar{G} \\ \bar{B} \end{bmatrix} = \frac{1}{N} \sum \begin{bmatrix} R \\ G \\ B \end{bmatrix}$$

where R, G, B are the red, green, and blue channel pixel values respectively. The sum is taken over the brightest pixels, and N is the number of pixels included in the sum.

A diagonal transformation matrix A is computed as follows:

$$A = \begin{bmatrix} 1/\bar{R} & 0 & 0 \\ 0 & 1/\bar{G} & 0 \\ 0 & 0 & 1/\bar{B} \end{bmatrix}$$

The color-corrected value $\xi'$ of a pixel $\xi \overset{def}{=} [R\ G\ B]^T$ is obtained through the linear transformation defined by equation 1:

$$\xi' \overset{def}{=} \begin{bmatrix} R' \\ G' \\ B' \end{bmatrix} = k \cdot (A\xi + b) \qquad \text{Eq. 1}$$

where b is chosen so that the color-corrected pixel values are within the range [0, k]; k is usually chosen to be 1 or 255. From this point forward in the present disclosure, the primes $\xi'$ and R', G', B' will be dropped in favor of $\xi$ and R, G, B for simplicity of notation, with the understanding that the color-corrected values are intended.

As noted above, in some embodiments, on the order of at least 300 FoVs can be captured for each blood sample. Not all of these images will contain white portions and, thus, white balancing every individual FoV image can lead to color distortion. To remedy this problem, it is possible to determine the white balance transform by separately acquiring one or more image(s) on a white portion of the microscope slide. This, however, introduces an extra scanning step into the workflow.

The systems and methods herein avoid color distortion introduced by forcing every FoV to be white balanced according to its own brightest pixels. The systems and methods herein also circumvent the need to additionally scan a clear region of the slide as an extra step.

Figure 4:
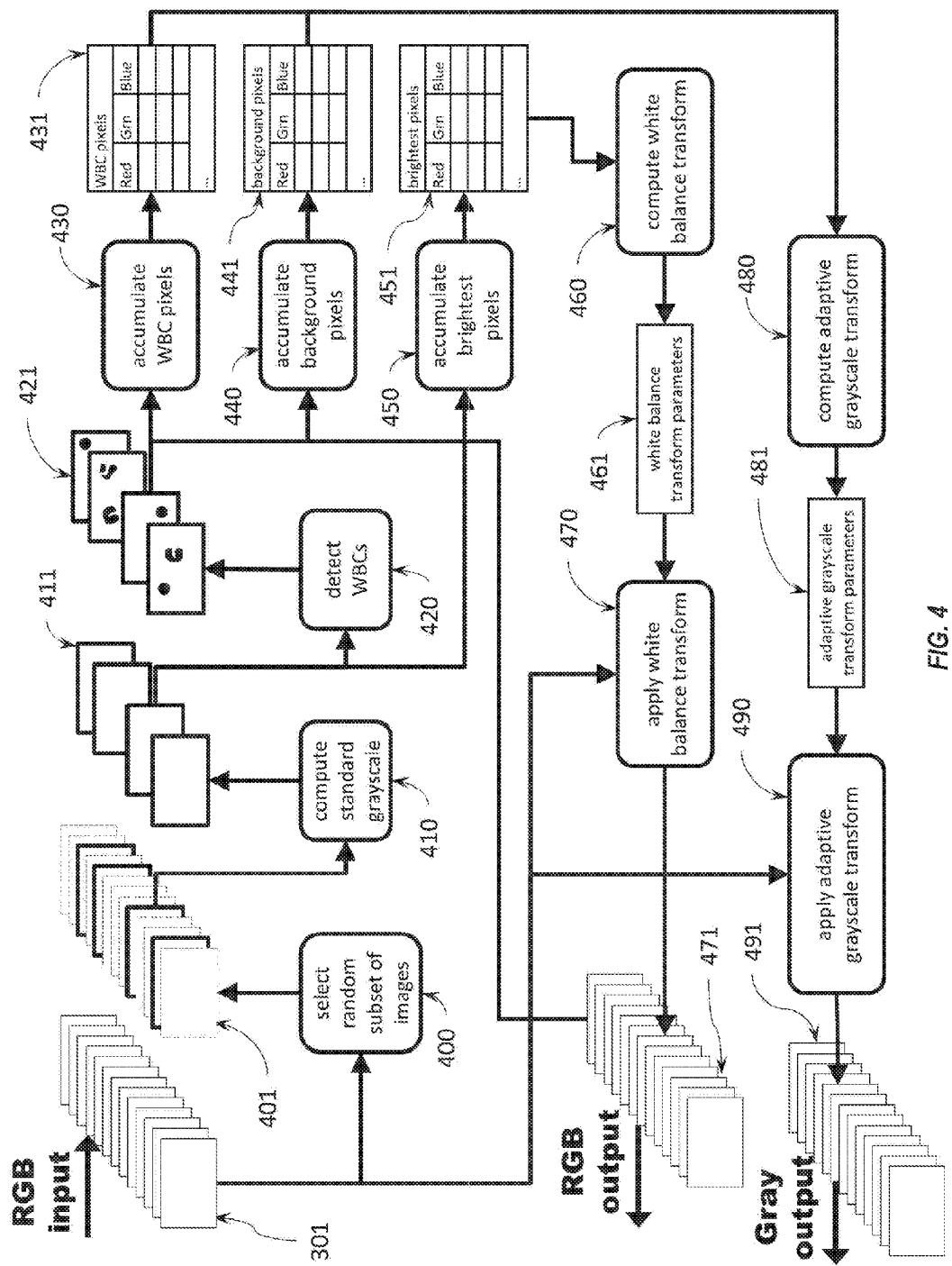
FIG. 4 is a detailed schematic of an image preprocessing module of the system of FIG. 3A, according to an embodiment.

The image preprocessing module 310 in FIG. 3A can be configured to determine the white balance transform for a sample by accumulating the brightest pixels across multiple FoVs. FIG. 4 shows a block diagram of the image preprocessing module 310. In an embodiment, a subset 401 of the totality of input FoV images 301 are selected at random at submodule 400. The number of FoVs in the subset of FoV images 401 is large enough so that the probability of including a clear region in the collection of pixels approaches one. The subset of FoV images 401 are converted to standard grayscale intensity images 411 by submodule 410 using a weighted sum of the color-corrected red, green, and blue channel pixel values defined by the formula in equation 2:

$$\phi_s = 0.299R + 0.587G + 0.114B \qquad \text{Eq. 2}$$

where $\phi_s$ is the standard grayscale intensity value of a pixel.

Using the grayscale intensity values; the red, green, and blue values of a sampling of the brightest pixels 451 in the subset 411 are selected by submodule 450 and stored in a data store (e.g., memory storage medium). Submodule 460 computes the white balance transform 461 from stored red, green, and blue color values from each of the sampling of brightest pixels 451. The white balance transform parameters 461 can be saved in the data store. Submodule 470 applies the white balance transform to the input images 301 to produce the color-corrected FoV images 471. The white balance transform algorithm and its associated parameters are described in detail herein.

The image preprocessing module allows for a general affine matrix for the transformation matrix in Eq. 1.

$$A = \begin{bmatrix} a_{11} & a_{12} & a_{13} \\ a_{21} & a_{22} & a_{23} \\ a_{31} & a_{32} & a_{33} \end{bmatrix}$$

In an embodiment, the affine matrix A is a rotation matrix (also noted as A).

Figure 5:
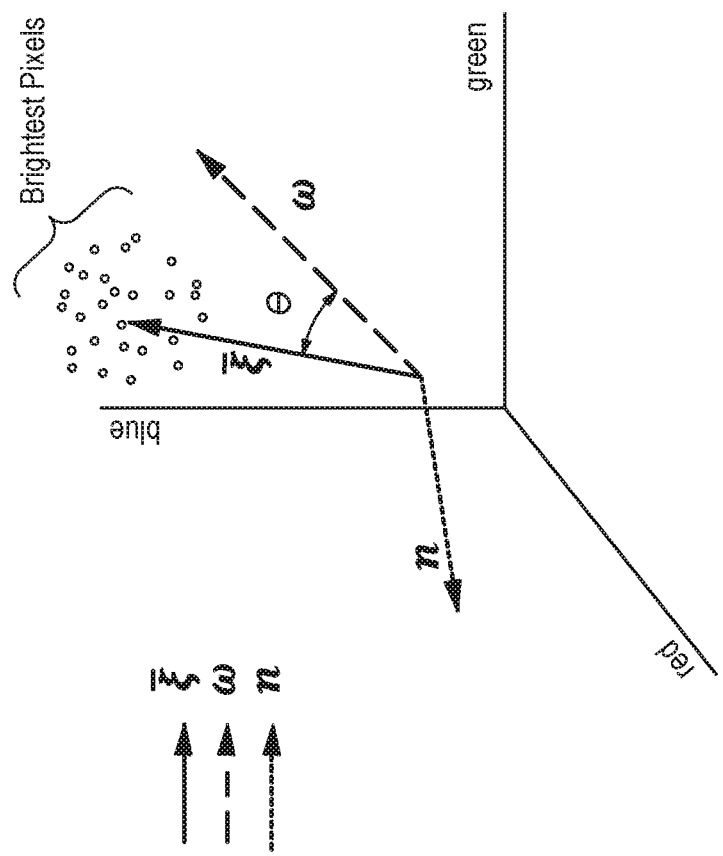
FIG. 5 is an illustration of the relationship between various vectors in a color value space of red, green and blue axes, according to an embodiment.

As stated above, the vector $\bar{\xi}$ is the average color of the sampling of brightest pixels 451. These pixels are shown in the red, green, blue pixel value space in FIG. 5. The color white is represented by the white vector $\omega=[k\ k\ k]^T$. The white balance transformation is defined by the rotation that rotates the vector $\bar{\xi}$ to the vector $\omega$ about an axis vector n that is perpendicular to both the white vector $\omega$ and average color vector $\bar{\xi}$. FIG. 5 is an illustration of the relationship between vectors $\bar{\xi}$, $\omega$, and n in a color value space of red, green and blue axes. The axis of rotation vector n can be computed by the system using the cross product:

$$n = \bar{\xi} \times \omega = \begin{bmatrix} \omega_2 \bar{B} - \omega_3 \bar{G} \\ \omega_3 \bar{R} - \omega_1 \bar{B} \\ \omega_1 \bar{G} - \omega_2 \bar{R} \end{bmatrix}$$

The rotation matrix A can be computed by the system using equation 3 below:

$$A = \begin{bmatrix} \hat{n}_1\hat{n}_1(1-\cos\theta)+\cos\theta & \hat{n}_1\hat{n}_2(1-\cos\theta)-\hat{n}_3\sin\theta & \hat{n}_1\hat{n}_3(1-\cos\theta)+\hat{n}_2\sin\theta \\ \hat{n}_2\hat{n}_1(1-\cos\theta)+\hat{n}_3\sin\theta & \hat{n}_2\hat{n}_2(1-\cos\theta)+\cos\theta & \hat{n}_2\hat{n}_3(1-\cos\theta)-\hat{n}_1\sin\theta \\ \hat{n}_3\hat{n}_1(1-\cos\theta)-\hat{n}_2\sin\theta & \hat{n}_3\hat{n}_2(1-\cos\theta)+\hat{n}_1\sin\theta & \hat{n}_3\hat{n}_3(1-\cos\theta)+\cos\theta \end{bmatrix} \quad \text{Eq. 3}$$

In equation 3, $\hat{n}=n/\|n\|$ is a unit vector in the direction of the axis of rotation n, where $\|\cdot\|$ denotes the standard $L^2$ norm. The cosine of the angle $\theta$ between the vectors $\bar{\xi}$ and $\omega$ can be computed via the dot product $\cos\theta = \hat{\omega}^T\hat{\xi}$, where $\hat{\omega}=\omega/\|\omega\|$ and $\hat{\xi}=\bar{\xi}/\|\bar{\xi}\|$.

Referring again to FIG. 3A, the image preprocessing module 310 can compensate for color variation in input images 301 as outlined above and outputs a plurality of output images 311 including color-corrected FoV images and adaptive grayscale intensity images, each including one or more focal planes therein. The next stage in the processing pipeline of the image analysis system 300 is the candidate object detection module 320. The candidate object detection module 320 is configured to find image locations that could potentially be analytes (e.g., malaria parasites). In order to find such potential analyte locations, the candidate object detection module 320 can use a plurality of adaptive grayscale transform images and a plurality of color-corrected (e.g., white balance transformed) images in the plurality of output images 311. The plurality of output images 311 including the plurality of adaptive grayscale transform images and plurality of color-corrected images can be determined and output by the image preprocessing module 310.

The candidate parasite nuclei can be detected by applying a dark threshold to a standard grayscale intensity image, which is calculated via the weighted sum shown in Eq. 2. This weighted sum can be viewed as a projection in the red, green, and blue pixel space that was introduced previously and shown in FIG. 5. The projection is in the direction of the vector defined by equation 4:

$$w_s = \begin{bmatrix} 0.299 \\ 0.587 \\ 0.114 \end{bmatrix} \quad \text{Eq. 4}$$

Representing the red, green, and blue values of a pixel as the column vector $\xi$, the grayscale projection in Eq. 2 can be written $\phi_s = w_s^T \xi$. To detect candidate parasite nuclei, a dark threshold can be applied to the standard grayscale intensity image intensity $\phi_s$ of each pixel, followed by one or more of area, color, and shape filters that may be applied to the blobs (e.g., candidate object clusters) detected by applying the dark threshold. The standard dark threshold is a filter that functions based at least in part on a determined difference between the grayscale intensity of each pixel of the candidate object and the grayscale intensity of the background or other non-analyte pixels present in the sample. Accordingly, the standard dark threshold can be used to filter (select or delete) pixels that are not beyond (e.g., above) the darkness threshold.

Figure 6:
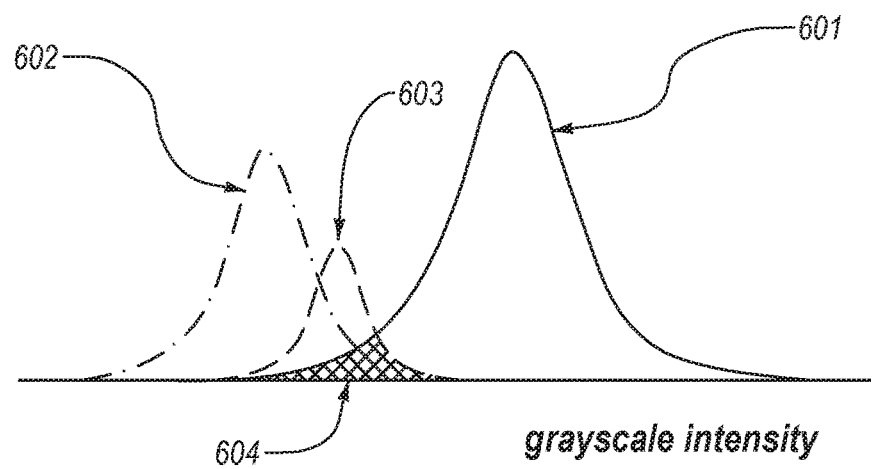
FIGS. 6A and 6B are grayscale intensity histograms for various pixels of various grayscale images, according to different embodiments.
Figure 6:
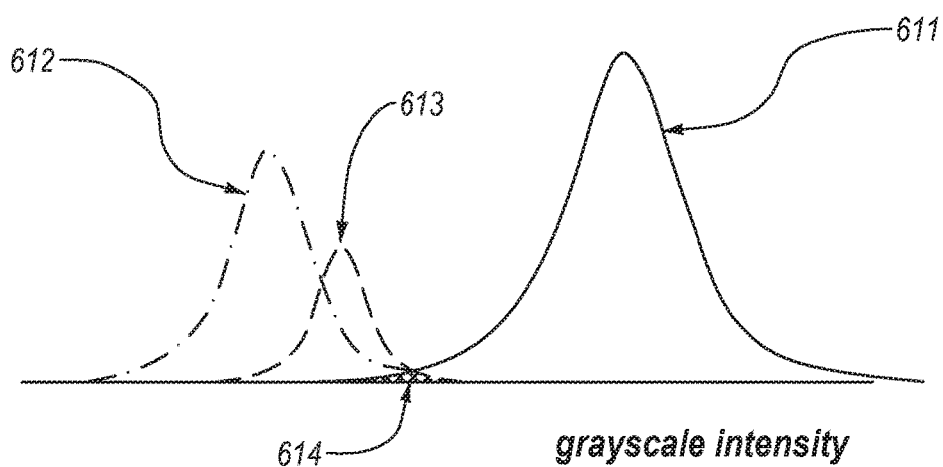

The sensitivity and specificity performance of the above noted technique for detecting candidate parasite nuclei is limited. Despite the general trend that parasite nuclei are dark and the background is light, there is a great deal of overlap between the parasite nuclei and background grayscale pixel values. FIG. 6A shows the grayscale intensity histograms for the background pixels 601, WBC nuclei pixels 602, and parasite nuclei pixels 603. The overlap between the parasite nuclei and background grayscale intensity values is shown as the cross-hatched area 604 in FIG. 6A.

Minimizing the overlap between the parasite nuclei and background grayscale intensity values enhances the sensitivity and specificity performance of the detection algorithm herein. The systems and methods herein determine (e.g., learn) and apply an adaptive grayscale projection vector $w_a$ that takes the place of the standard grayscale projection vector $w_s$ defined in Eq. 4. Such determination can be accomplished using machine learning techniques. Such application can provide a greater separation of grayscale intensity values corresponding to white blood cell nuclei pixels and analyte (e.g., malaria parasite) pixels from grayscale intensity values corresponding to background pixels.

The minimization of overlap disclosed herein leverages the presence of blood components that are simple to detect in the standard grayscale intensity image and which stain similarly to parasite nuclear material.

Under Giemsa stain, a ring-form parasite's nuclear material stains magenta as noted above. In particular, the nuclear material is, in general, darker than the surrounding background material, which consists of red blood cell (RBC) material that has been lysed by the action of the water used in the Giemsa staining process as well as other blood components such as platelets. This background material can stain a broad spectrum of colors from light pink to medium blue. In addition to parasites (if the blood is so infected), lysed RBCs, and platelets; WBCs are a ubiquitous presence in blood smears. As noted above, WBC nuclei stain dark magenta under Giemsa, the same color as parasite nuclear material, albeit stained WBC nuclei are, for the most part, darker than stained parasite nuclei as they are larger and absorb more light. WBC nuclei are relatively easy to detect and classify as they are large, regularly shaped, and dark magenta in color. Accordingly, in some embodiments, the WBC nuclei can serve as an easily detectable analog for a parasite nuclei. The systems and methods herein apply a dark threshold to the standard grayscale intensity images, followed by one or more of an area, color, or shape filter to obtain WBC nuclei at sufficiently high sensitivity and specificity.

Referring again to the schematic of the image preprocessing module in FIG. 4, WBC detector submodule 420 is applied to the subset of grayscale FoV images 411 using the straightforward WBC detection algorithm outlined above, thereby producing a series of binary images 421 that indicate which image pixels are part of WBC nuclei. Submodule 430 accumulates a random sample of the R, G, B values of the detected WBC nuclei pixels 431 and stores them in a data store. Pixels that are not part of WBCs are categorized as potential background pixels. Dark pixels are excluded from background pixels to avoid pollution of the background pixels with either parasite nuclei pixels (which are not detected by the WBC detector because they are too small) or pixels from dark regions that correspond to staining artifacts (e.g., RBCs, platelets, etc.). The systems and methods herein can include submodule 440 which can accumulate a random sample of the qualified background pixels 441 store the same in a data store.

The WBC nuclei pixel values 431 and the background pixel values 441 can be used by a machine learning algorithm (or module) to determine an adaptive grayscale projection vector $w_a$ (in the red, green, blue pixel value space) that optimizes the separation between WBC nuclei and background. In an embodiment, a ridge regression technique can be used (e.g., by at least one processor as stored in at least one memory storage medium) to learn the optimal vector $w_a$. In some embodiments, a design matrix X can be constructed by stacking the red, green, and blue values for the WBC nuclei and background pixels such as according to the following matrix:

$$X = \begin{bmatrix} R_1 & G_1 & B_1 \\ \cdots & & \\ R_N & G_N & B_N \\ R_{N+1} & G_{N+1} & B_{N+1} \\ \cdots & & \\ R_{N+M} & G_{N+M} & B_{N+M} \end{bmatrix} \begin{matrix} \} & N & WBC \text{ nuclei pixel values} \\ \\ \} & M & \text{background pixel values} \end{matrix}$$

where N is the number of WBC nuclei pixels and M is the number of background pixels accumulated. A corresponding target variable η vector can be constructed as N ones stacked on top of M zeros such as according to the following matrix:

$$\eta = \begin{bmatrix} 1 \\ \cdots \\ 1 \\ 0 \\ \cdots \\ 0 \end{bmatrix} \begin{matrix} \} & WBC \text{ nuclei} \\ \\ \} & \text{background} \end{matrix}$$

In some embodiments, a ridge regression aims to find the vector $w_a$ that minimizes the following $L^2$-regularized optimization problem having the formula defined by equation 5 below:

$$w_a = \text{Arg Min}_w \|Xw - \eta\|^2 + C\|w\|^2 \qquad \text{Eq. 5}$$

where C is a suitably chosen regularization constant. The methods and systems herein can use the adaptive grayscale direction vector $w_a$ is to compute an adaptive grayscale intensity $\phi_a$ via the projection having the formula $\phi_a = w_a^T \xi$.

As shown in FIG. 6B, the use of the adaptive grayscale intensity image in place of the standard grayscale intensity image results in a greater separation between WBC nuclei and background grayscale intensity values than the separation found in standard grayscale intensity images, and hence also between parasite nuclei and background grayscale intensity values. The histograms for the adaptive grayscale intensity image are shown in FIG. 6B, where it can be seen that the overlap area 614 is substantially reduced compared to the overlap area 604 in FIG. 6A which was determined using the standard grayscale intensity images.

In some embodiments, a polynomial regression can be used instead of a linear regression as describe above. The polynomial regression is an extension of linear regression and permits a non-linear relationship between the target variable η vector and the predictor variable(s) (e.g., $\xi$). For example, polynomial regression can be used by the methods and systems herein to find a linear relationship between the target variable η and the second order polynomial predictor variable $\zeta$. In one embodiment, a second order polynomial predictor variable $\zeta$ can be defined by equation 6 below.

$$\zeta = [R G B R^2 G^2 B^2 R G R B G B]^T \qquad \text{Eq. 6}$$

In some embodiments, higher order polynomials can be incorporated into regressions used to determine the adaptive grayscale intensity, to provide adaptive grayscale intensity images. This concept can be further generalized to include predictor variable components that are rational functions of the R, G, and B values. In one embodiment, a 24-component predictor variable $\zeta$ can be used to determine an adaptive gray scale intensity to provide adaptive grayscale intensity images having greater separation of intensity values between background pixels and WBC and analyte pixels. In an embodiment, the 24-component predictor variable $\zeta$ can have the formula defined by equation 7 below:

$$= \left[ R\ G\ B\ R^2\ G^2\ B^2\ RG\ RB\ GB\ \frac{R}{G+\epsilon}\ \frac{R}{B+\epsilon}\ \frac{G}{R+\epsilon}\ \frac{G}{B+\epsilon}\ \frac{B}{R+\epsilon}\ \frac{B}{G+\epsilon}\ \cdots \right.$$
$$\left. \frac{R}{G+B+\epsilon}\ \frac{G}{R+B+\epsilon}\ \frac{B}{R+G+\epsilon}\ \frac{R}{R+G+B+\epsilon}\ \frac{G}{R+G+B+\epsilon}\ \frac{B}{R+G+B+\epsilon}\ \frac{R+G}{R+G+B+\epsilon}\ \frac{G+B}{R+G+B+\epsilon}\ \frac{R+B}{R+G+B+\epsilon} \right]^T$$

Eq. 7 where $\epsilon$ is a suitably chosen constant to prevent the denominator of the ratios from vanishing. In other embodiments, other non-linear functions of the R, G, and B components are used. Introduction of a non-linear relationship between the target and predictor variables serves to further enhance the separation between parasite nuclei pixels and background pixels in the adaptive grayscale intensity images. Some form of regularization is used for the regression computations disclosed above. Regularization serves to offset the negative consequences of multicollinearity between components of the predictor variable $\zeta$. In various embodiments, the regularized regression technique is chosen from among the following: ridge regression, lasso regression, principal components regression, and partial least-squares regression.

Referring again to FIG. 4, submodule 480 computes a regression model between the predictor variables $\xi$ or $\zeta$, and the target variable $\eta$. The parameters of the regression model 481 can be stored in the data store and used by submodule 490, along with the input images 301, to compute the adaptive grayscale intensity images 491. The color-corrected images 471 along with the adaptive grayscale intensity images 491 are the output images 311 (FIGS. 3A and 3C) of the image preprocessing module 310. The output images 311 include $n_{x,y}$), FoVs, each consisting of $n_z$ focal planes, each focal plane consisting of the color-corrected red, green, and blue component image(s) as well as adaptive grayscale intensity image(s), as shown in FIG. 3C.

Figure 7:
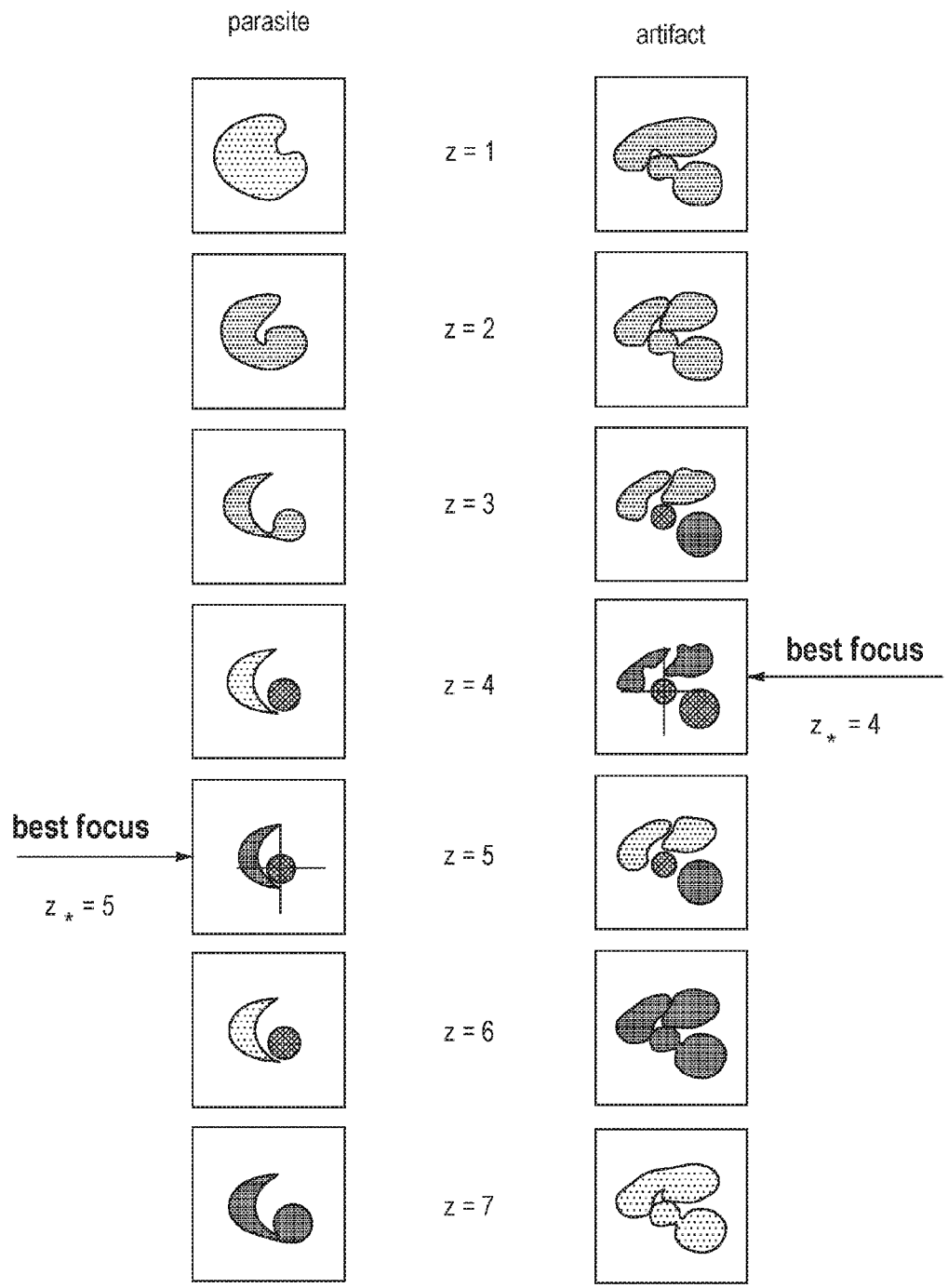
FIG. 7 is a side-by-side comparison of images of different FoVs having multiple focal planes, where one FoV includes a parasite and the other FoV includes an artifact therein, according to an embodiment.

As noted previously, a parasite located in an FoV can be in best focus in any one of the $n_z$ focal planes that are captured. FIG. 7 is a side-by-side comparison of FoVs having multiple focal planes, one FoV includes an analyte (e.g., parasite) and the other FoV includes an artifact (e.g., platelet) therein. The image analysis systems herein are configured to examine all the focal planes for every input FoV to find potential parasite locations. The appearance of a parasite will be different in each focal plane image. Each FoV can include 1 or more focal planes such as 1, 2, 3, 4, 5, 6, 7, 8, 9, or more than 9 focal planes. The left column of FIG. 7 shows a small section of an FoV containing a parasite in an embodiment with $n_z$=7 focal planes (e.g., seven different focal planes). In some embodiments, one or more clusters of pixels indicating a candidate object (e.g., blob(s)) can be detected in one or more focal planes in the vicinity of a parasite, such as by applying a threshold on the adaptive grayscale intensity images for each of the focal planes. In this same manner, candidate objects can be detected in the vicinity of artifacts that are darker than the background, for example in the vicinity of platelets. The right column of FIG. 7 shows a small section of an FoV containing a candidate object that is not a parasite, but rather an artifact (e.g., it can be a platelet or stain aggregate).

B. Candidate Object Detection Module

Figure 8:
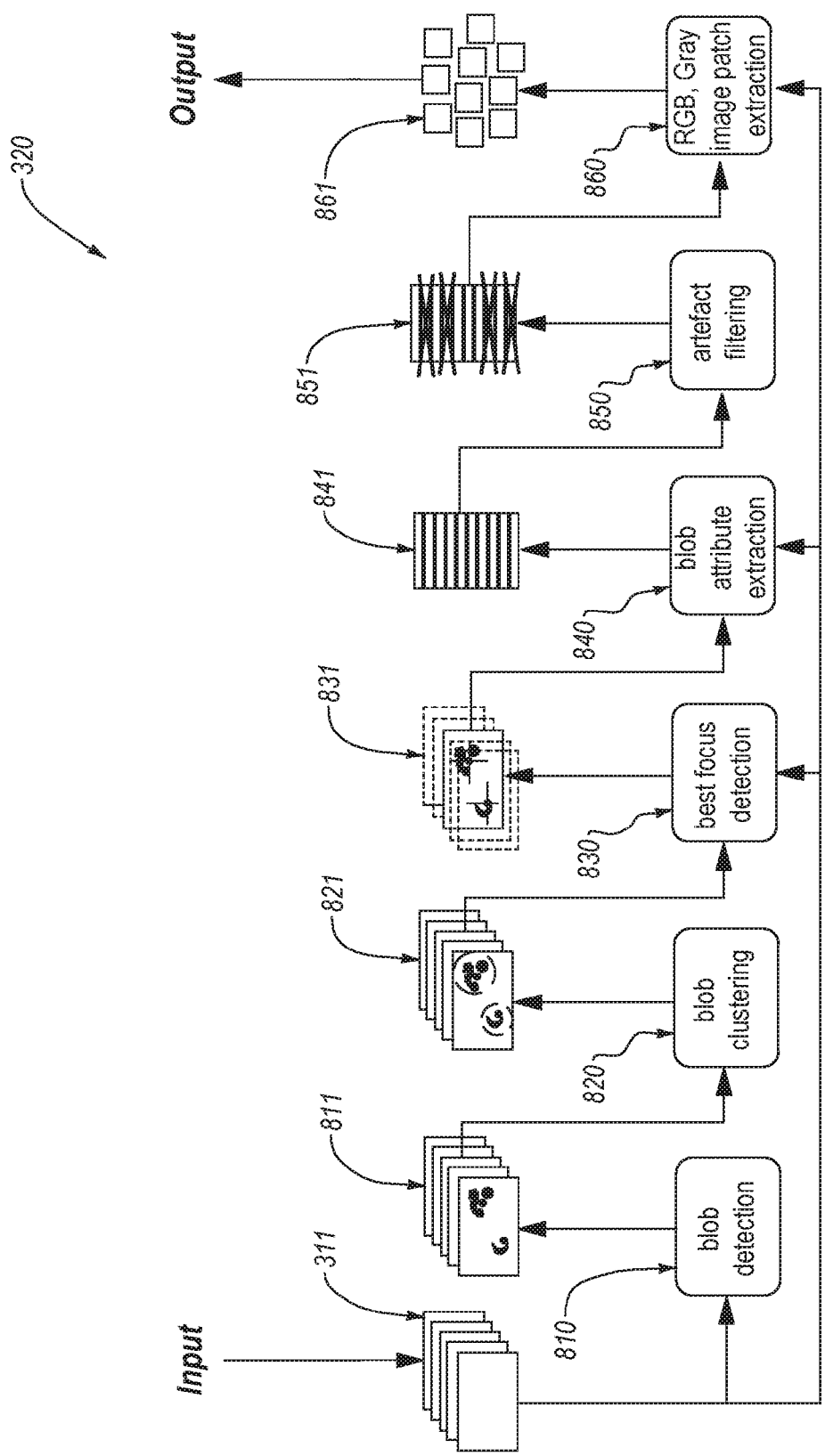
FIG. 8 is a detailed schematic of a candidate object detection module of the system of FIG. 3A, according to an embodiment.

FIG. 8 is a schematic of the candidate object detection module 320 also shown in FIG. 3A. The output images 311 (e.g., set of color-corrected RGB and adaptive gray images) are input to the candidate object detection module 310. The candidate object detection module 310 can include a plurality of submodules each configured as described below.

The submodule 810 can perform a thresholding operation on the adaptive gray images and output one or more detection masks 811. The submodule 820 can be configured to associate detected clusters of pixels indicating a candidate object (referred to hereinafter as "blobs") that are close to each other (in the $\langle x, y \rangle$ image coordinates) as part of one candidate object and output the locations of the object clusters 821. The submodule 830 can be configured to find the plane of best focus 831 for each candidate object or a portion thereof by determining the focal plane with the highest focus score for an image patch (e.g., subsection of an FoV having a candidate object therein) containing the detected candidate object. The submodule 830 can determine, select, and output the focal plane(s) with the highest focus score 831 for each candidate object. In an embodiment, a Brenner score can be used to find the plane of best focus 831, which is denoted by $z_*$. Other focus scores can be used in other embodiments. In the embodiment shown in FIG. 7, $z_*$=5 is the best focal plane for the candidate object (parasite) in the left column therein. The best focal plane for the candidate object (artifact) in the right column of FIG. 7 is $z_*$=4. Submodule 830 also identifies the darkest blob in the best focal plane and considers (e.g., determines, assumes, or at least temporarily assigns) that this blob represents the candidate object of interest. In another embodiment, the roundest blob is assigned to represent the candidate object of interest. A rounder blob may more closely correspond to a malaria parasite or portion thereof such as a cytoplasm or nuclei. In various embodiments, other attributes or combinations of attributes are used to select the representative blob. The blob centers are marked by a cross-hair in both columns of FIG. 7, $z_*$=5 and $z_*$=4, respectively.

Referring to FIG. 8, submodule 840 is configured to determine (e.g., compute) attributes 841 of the main blob for each candidate object. Attributes such as area, roundness, grayscale intensity, etc. are computed by submodule 840. Submodule 850 can be configured to filter the candidate objects based at least in part on at least in part on the determined attributes. Filtering the candidate objects based at least in part on the determined attributes reduces the number of artifacts in the collection of candidate objects as indicated at 851. Submodule 850 can be configured as or include an artifact classifier configured to score the candidate objects based at least in part on one or more attributes. The submodule 850 can be configured to determine a score for a candidate object based on one or more of any of the determined attributes disclosed herein, such as scores relating to probability that the candidate object is an analyte based at least in part on one or more characteristics (intensity, color, shape, size, etc.) of the one or more candidate objects. The submodule 850 can be configured to discard candidate objects with a score below a threshold score.

The artifact classifier of submodule 850 can be pre-trained with images of objects whose ground truth identity (as an analyte or non-analyte) are known through an annotation process, whereby parasites are marked in advance by a human expert. The annotation process stores the $\langle x, y \rangle$ location and best focal plane $\langle z \rangle$ of a large number of parasites. Candidate objects that are close to the known parasite locations are considered to represent parasites. Candidate objects that are not close to a known parasite location are considered to represent artifacts. The attributes and ground truth class of known parasites and artifacts are used to pre-train the artifact classifier 850. In one embodiment, the artifact classifier is configured as a non-linear kernel SVM. In other embodiments, other classifiers are used. Submodule 860 can be configured to extract and output image patches 861 of the filtered candidate objects. The image patches 861 are small sections of the color-corrected RGB images and the adaptive grayscale intensity images that contain a candidate object. These image patches 861 (321 in FIG. 3A) are output to the feature extraction module, which is shown as block 330 in FIG. 3A.

C. Feature Extraction Module

Figure 9:
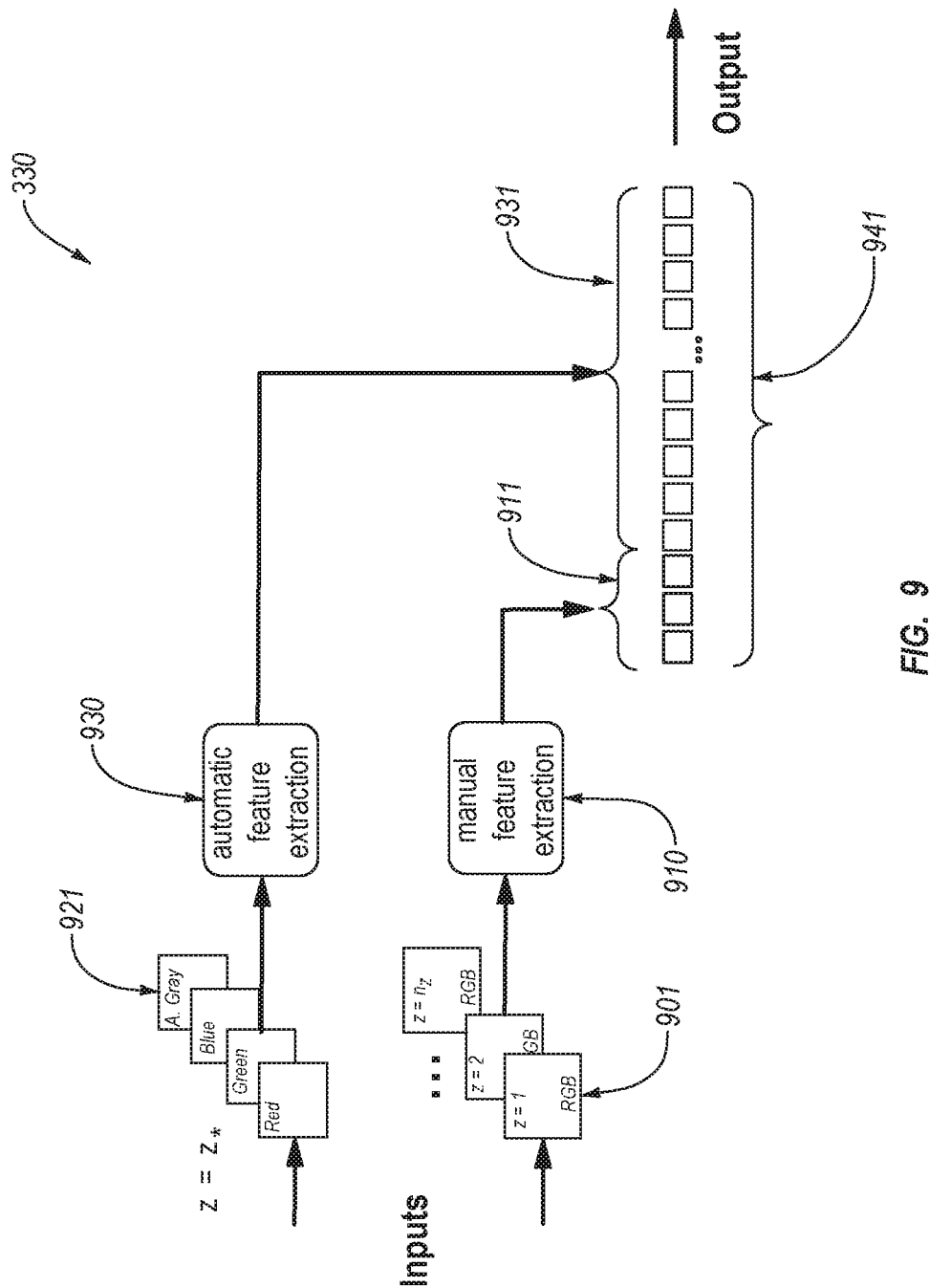
FIG. 9 is a detailed schematic of a feature extraction module of the system of FIG. 3A, according to an embodiment.

FIG. 9 is a schematic of a feature extraction module 330 also shown in FIG. 3A. The feature extraction module 330 is configured to represent each candidate object as a feature vector and output the same. The feature vector(s) can be classified as parasite (even which species or stage of parasite) or artifact by the object classifier module 340 of FIG. 3A. The feature extraction module 330 is configured to compute at least one of two types of features as shown in FIG. 9. The features can be manual features or automatic features. The feature extraction module 330 has two sets of inputs, one for the manual feature extraction and the other set for the automated feature extraction. The feature extraction module 330 can operate in one of two modes, manual feature extraction ON, or manual feature extraction OFF. In various embodiments, manual feature extraction can be ON or OFF, while the automatic feature extraction is always ON.

A first approach to feature extraction is manual feature extraction or feature engineering in the computer vision field. These are features that are intentionally designed to measure particular attributes of a candidate object, and rely heavily on learned (e.g., previously known or preprogrammed) domain knowledge.

Inputs 901 for the manual features are color-corrected R, G, B image patches containing the candidate object and all $n_z$ focal planes thereof. Submodule 910 of the feature extraction module 330 contributes three manual features 911 to the feature vector.

The first manual feature is the best focus score of the candidate object (e.g., a Brenner score). Referring back to FIG. 7, a focus score is computed over the image patch region for each of $n_z$ focal planes and the best focal plane is the one with the highest focus score. The second manual feature is the standard deviation (and/or other measure of dispersion) of the focus score across the focal planes of an FoV having the candidate object feature therein. The motivation behind this is that some artifacts, like air bubbles and dust particles on the specimen, will have the same focus score across all focal planes because they are far from being in focus, whereas ring-form malaria parasites (or other analytes) will have a narrow focus score distribution bracketing the best focal plane and thus a small standard deviation of focus score.

Submodule 910 can be configured to extract the third manual feature, which is called the red-shift score (the red-shift is being used herein as a descriptive term and is not related to the red-shift phenomenon caused by the Doppler effect). The red-shift score helps to distinguish between parasites and artifacts. The red-shift score relies on the confluence of two concepts. The first concept is optical dispersion, which refers to the variation in refractive index according to wavelength. This means that an uncorrected, simple lens will focus different wavelengths of light at different focal planes (e.g., different lengths away from the lens).

FIGS. 10A and 10B are illustrations of light rays being refracted to different focal planes through a simple lens and a lens with an achromatic correction, respectively. In FIG. 10A, rays of light for three representative wavelengths in the red, green, and blue portions of the spectrum are shown coming to focus at planes 1001, 1002, and 1003, respectively. As the light passes through the simple lens 1010, the red, green, and blue wavelengths refract to different focal planes. The focus vs. wavelength curve 1030 for a simple lens is shown in FIG. 10C and the representative focal planes for the rays that came to focus at 1001, 1002, and 1003 are indicated by the points on the curve 1030 at 1031, 1032, and 1033, respectively.

Lenses with achromatic correction help to limit the amount of chromatic aberration caused by dispersion. An achromatically corrected lens is shown in FIG. 10B, along with three representative wavelengths in the red, green, and blue portions of the spectrum. The achromatically corrected lens can include, for example, a simple lens component 1010 (e.g., crown glass component) that is convex, mounted or bonded to an achromatic component 1020 (e.g., flint glass component) that is concave. An achromatically corrected lens is designed to bring two wavelengths to focus at the same plane, such as plane 1005 shown in FIG. 10B. As shown, in some embodiments, the two wavelengths are in the red and blue portions of the spectrum.

A focus vs. wavelength curve for an achromatic lens is shown as curve 1040 in FIG. 10C and the representative focal planes for the rays that came to focus at 1004 and 1005 are indicated by points 1044 and 1045 on the curve 1040, respectively. It can be seen in FIG. 10C that the portion of the curve 1040 in the red region of the spectrum (640-700 nm) is more gently sloping upward than the portion of the curve 1040 in the blue region (450-500 nm). Thus, as the focus setting on the microscope is moved towards the upper portion of the graph, blue light will defocus more quickly than red light. Green light does not go out of focus as quickly as either the red or the blue components of light as the microscope focus is shifted upward. This can be seen from the relative flatness of the bottom of the curve 1040 in FIG. 10C, which is in the green region of the spectrum. The first concept relies on this shift in light focal planes as the microscope focus is adjusted.

Figure 11:
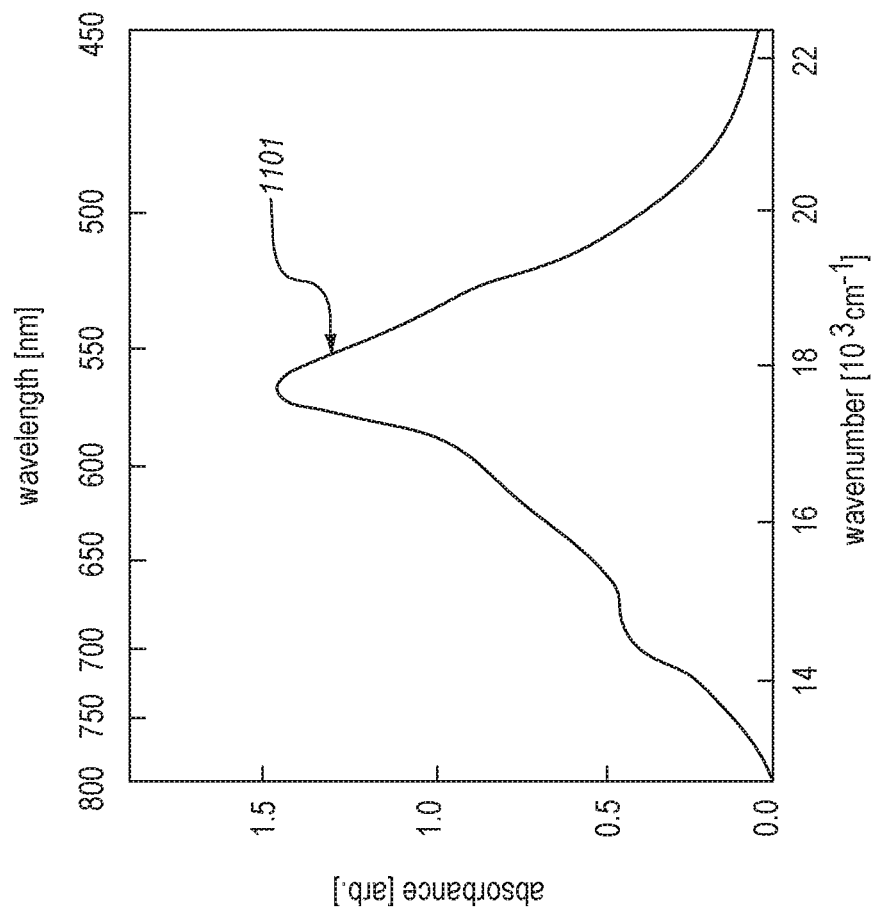
FIG. 11 is a graph of the absorption spectrum of a Giemsa stained DNA sample, according to an embodiment.

The second concept which the red-shift score depends on, are the light absorption properties of analytes (e.g., DNA) when stained, such as with Giemsa. FIG. 11 is a graph of the absorption spectrum 1101, which shows peak absorption in the green region of the spectrum. The absorption of green light by a conjugate of Methylene blue and Eosin Y is amplified in the presence of DNA. This means that material on a microscope slide containing DNA—cell nuclei for example—will largely absorb green light and transmit red and blue light, which accounts for their magenta color in transmitted light microscopy. Artifact objects do not contain DNA, and, therefore, tend to absorb less in the green portion of the spectrum. Accordingly, the artifacts do not appear magenta in the image.

Based on the observation above that changing the focal plane of the microscope upward will defocus blue wavelengths faster than red wavelengths, it follows that magenta objects will appear more red because the blue component of the light will have diffused to a larger spatial region, more so than the red light. This is the basis of the red-shift score, which measures the increase in redness of the darkest portion of the detected candidate object, which for a true Malaria parasite is the nucleus of the parasite cell. An artifact that transmits red, green, and blue light more equally will not turn more red as the focus of the microscope is shifted upward, which counterbalances the red-shift effect of the red and blue components as described above. Thus, the red-shift score provides a basis for distinguishing between parasites and artifacts.

The systems and methods disclosed herein are configured to analyze the candidate object images for red-shift and provide a score based thereon. The manual feature extraction submodule 910 (and associated microscope) can be configured to determine the red-shift score as described above. While DNA, Malaria parasites, and the color red are provided as an example, the concept of red-shift scoring can be applied to different colors and analytes, without limitation.

The second type of features extracted by the feature extraction module are automatic features, which can be automatically learned by a system including at least one memory storage device and at least one processor, such as a convolutional neural network (CNN). CNNs are deep learning models (applied by computer systems) that learn multiple levels of representation. Starting with the raw input layer, each successive layer (e.g., convolutional, pooling, sub-sampling, or fully connected layer) represents the information in the image at a slightly more abstract level. The weights (filters) in each layer are learned using a standard learning procedure such as back-propagation of error (backprop). In a CNN, each layer (of calculations) is performed by a distinct plurality of neurons (processing modules), and the neurons in each convolutional layer are not fully interconnected with all of the neurons in adjacent layers of the system. Rather, the neurons in the convolutional layers have only selected connectivity with adjacent convolutional layers to reduce the amount of inputs carried through to successive convolutional layers. At each convolutional layer, a convolutional kernel defines the region of connectivity with neurons in the previous layer. The convolutional kernel is sometimes referred to as the receptive field of the neuron in the convolutional layer. One or more of the final layers in the CNN is a fully connected layer having full connectivity to the immediately previous layer, effective to perform high-level reasoning based on the data (that has been repeatedly abstracted throughout the layers) provided therefrom. In some embodiments, ground truth(s) (e.g., image patches that contain ground truth objects, which have been identified by a human expert) can be used to train the weights of the CNN via a learning procedure. CNN's can be stored on and performed by a computer having one or more processors (e.g., central processing units (CPUs) or graphics processing units (GPUs)). The ground truths images or image patches can include known positive samples (e.g., identified to the CNN as having the analyte of interest) and known negative samples, (e.g., identified to the CNN as having no analyte therein, or having only known artifacts or other non-analyte objects therein). Accordingly, the CNN can learn weights from both known analyte and non-analyte species, which can be used to identify the same in samples.

In an embodiment, a computer vision system such as a microscope operably coupled to a digital recorder can be operably coupled to a CNN. Such systems can exceed human level performance in terms of accuracy. The automatic feature extraction submodule 920 can be configured to carry out feature extraction based at least in part on a feed-forward application of weights, pooling, and non-linear operations.

A large amount of data is required to train a CNN because of the richness of the model. If insufficient data are available for training, overfitting can occur, which results in poor generalization performance. In some embodiments, the systems and methods herein can increase the amount of training data by generating artificial data based at least in part on the training data itself. This process is called augmentation. Augmentation can take the form of one or more random transforms applied to the training images. Examples of augmentation transforms are translation, rotation, scaling, reflection, and color distortion.

One technique for color distortion consists of the following steps. First, the principal components transform of the training images in the R, G, B color space is computed. The eigenvectors are denoted $p_1$, $p_2$, $p_3$ with corresponding eigenvalues $\lambda_1$, $\lambda_2$, $\lambda_3$, respectively. Three random numbers $r_1$, $r_2$, $r_3$, are sampled from a bounded distribution, for example, a Gaussian with zero mean and standard deviation 0.1. To generate the augmented image, the following quantity is added to each pixel in the image:

$$[p_1 p_2 p_3][r_1 \lambda_1 r_2 \lambda_2 r_3 \lambda_3]^T$$

The random numbers, $r_1$, $r_2$, $r_3$ are sampled once per image presentation during the training of the CNN.

The above technique for color distortion can lead to images with unrealistic color. It is desirable to introduce a color distortion method (and system for carrying out the same) that generates images with realistic color, while at the same time providing enough color distortion to avoid overfitting of the CNN. Such color distortion can aid in normalizing color variations in images due to color variations of stains from one sample to another. For example, in Giemsa stain, the relative amounts of basophilic blue and acidophilic eosin (red) present in the stained sample depends on pH of the stain, which varies in the field. Color normalization through the distortion methods herein may aid in achieving more accurate diagnoses. In a second color augmentation method of the present disclosure, each of the red, green, and blue channels (e.g., components) of the image can be distorted with a gamma non-linearity, which is also called a gamma correction, although in this case it is being used to transform the colors of the image rather than correct them. Gamma correction is defined by the following non-linear transform in equation 8:

$$\tilde{\psi} = \alpha \tilde{\psi}^{\gamma} \quad \text{Eq. 8}$$

where $\psi$ is the input value, $\tilde{\psi}$ is the output value and $0 < \gamma < \infty$ is the exponent of the non-linearity, and $\alpha$ is a scaling constant. When the input values $\psi$ are in the range [0,1], the scaling constant $\alpha=1$. The color augmentation method of the present disclosure samples four random numbers $r_1, r_2, r_3, r_4$ from a Gaussian with zero mean and standard deviation $\sigma$. Then, four values of $\gamma$ are computed via the relation $\gamma_i = e^{r_i}$, where is e the base of the natural logarithm. The augmented red, green, blue, and adaptive gray channel/component images are generated by equation 9 respectively, as follows:

$$\tilde{R} = R^{\gamma_1}$$

$$\tilde{G} = G^{\gamma_2}$$

$$\tilde{B} = B^{\gamma_3}$$

$$\tilde{\phi}_a = \phi_a^{\gamma_4} \quad \text{Eq. 9}$$

The random numbers $r_1$, $r_2$, $r_3$, $r_4$ are sampled once per image, per augmentation. Accordingly, each of the R, G, B and intensity $\phi$ channels can be individually and collectively augmented to provide a larger sampling of data to train a CNN suitable for use with the systems and methods herein.

Referring again to FIG. 9, image patches 921 are inputs to the CNN feature extractor 930. In some embodiments, an augmented set of ground truth image patches that have been augmented using a data augmentation scheme can be used to train the CNN to recognize analytes or non-analyte objects. That is, the raw images or portions thereof such as image patches are augmented using translation, rotation, scaling, reflection, and gamma-based color distortion as described above. In some embodiments, the at least one processor (associated with the CNN) is configured to learn a set of weights based at least in part on one or more of an augmented set of ground truth image patches, color-corrected image patches, or grayscale intensity image patches that have been augmented according any of the methods disclosed herein. For example, the ground truth image patches can be augmented by a data augmentation scheme that includes a random gamma correction of one or more of a red, green, blue, or grayscale intensity component of the ground truth image patches. In some embodiments, image patches at the best focal plane for each candidate object are presented for CNN training. In other embodiments, image patches of all focal planes are presented for CNN training. In some embodiments, the at least one processor is configured to augment color-corrected image patches and adaptive grayscale intensity image patches using an augmentation scheme. In some embodiments, outputting of the color-corrected image patches and the adaptive grayscale intensity image patches can include using an augmentation scheme to augment the color-corrected image patches and the adaptive grayscale intensity image patches. In some embodiments, during the testing phase of the CNN feature extractor, no augmentation is performed. In other embodiments, augmentation is performed during the testing phase and the outputs of the classifier module, shown as block 340 in FIG. 3A, are averaged over the augmented versions of each testing sample. In some embodiments, the at least one processor is configured to average an output of a machine learning classifier over the feature vectors corresponding to augmented versions of each of the color-corrected image patches and the adaptive grayscale intensity image patches.

The output of the CNN feature extraction submodule 930 is the CNN components 931 of the feature vector. In an embodiment that uses both manual and CNN features, the manual features 911 and the CNN features 931 can be concatenated to form the full output feature vector 941. In embodiments without manual features, the manual feature extraction submodule 910 is not executed and manual features 911 are not prepended to the output feature vector 941.

Returning to the system diagram in FIG. 3A, the output of the feature extraction module 330 are the feature vectors 331 of the candidate objects.

D. Object Classifier Module

The object classifier module 340 is configured to classify the feature vectors 331, as corresponding to an analyte (e.g., parasite) or artifact. The object classifier module 340 is configured to classify the feature vectors 331 or output from the feature vector extraction module 330, as parasite or artifact using a machine learning classifier. The machine learning classifier can be a program stored in one or more memory storage mediums, which is executable by one or more processors=, such as in a computer system or network. The object classifier module 340 can be trained as disclosed above using the parasite ground truth data disclosed above. Different embodiments of the object classifier module 340 can include different types of classifiers. In an embodiment, the object classifier module 340 is configured as a linear support vector machine. For example, a linear support vector machine can include a computing device configured to perform a linear support vector classification. In various embodiments, the object classifier module 340 can be configured as one or more of the following types of classifiers: a non-linear kernel support vector machine, neural network, logistic regression, random forest decision trees, gradient boosted decision trees, AdaBoost, or Naïve Bayes classifier.

The output of the object classifier module 340 can include a calibrated probability that the candidate object is a parasite (e.g., analyte) or artifact. The object classifier module 340 is configured to output classified object data 341 (FIG. 3A). The classified object data 341 can include a score(s) corresponding to (e.g., indicating the extent of) the similarity between the ground truth object(s) and the candidate object(s). The similarity can be expressed as a probability that the candidate object (or one or more aspects thereof) is an analyte such as a parasite (or one or more aspects thereof). In some embodiments, the object classifier module 340 (machine learning classifier) can be configured to classify the one or more feature vectors by averaging the output of the machine learning classifier (e.g., probabilities) over the feature vectors corresponding to augmented versions of each of the input image patches.

E. Diagnosis Module

The diagnosis module 350 (FIG. 3A) can be configured to determine and to output a diagnosis 351 for the sample (e.g., blood slide) based at least in part on the classified object data 341, i.e. either POSITIVE—the sample does contain malaria parasites, or NEGATIVE—it does not. The diagnosis 351 can include an estimate of the parasitemia ($\hat{p}$ as used in equation 10 below). In some embodiments, the diagnosis module 350 can be configured to determine the parasitemia. In some embodiments, the diagnosis module is configured to run a diagnosis algorithm that counts the number of candidate objects $N_c$ whose object classifier scores are above some threshold $\Theta_c$. In some embodiments, more than one type of candidate object (e.g., ring form malaria parasite and late-stage parasite objects) can be counted at one time. Subsequently, the number of candidate objects with object classifier scores above $\Theta_c$ is thresholded at some level $\Theta_N$. In other words, a sample is flagged as POSITIVE if $N_c > \Theta_N$, and NEGATIVE otherwise. The thresholds $\Theta_c$ and $\Theta_N$ can be optimized on a validation set whose diagnoses are known, either through microscopic examination by a human expert or a molecular test such as polymerase chain reaction (PCR). The optimization is based at least in part on a given objective for the validation set, such as maximizing balanced accuracy, or maximizing sensitivity at a fixed level of specificity.

The image analysis systems disclosed herein, being a real-world system, can have some residual noise floor that depends on the threshold applied to the object classifier scores. In other words, at some object classifier thresholds, some non-parasite objects will have scores above that threshold. In some embodiments, the median object-level false positive rate $\overline{FPR}$ is computed on the negative samples in the validation set as a function of an object classifier score threshold $\Theta_q$. At the same time, the median object-level sensitivity rate $\overline{SNS}$ is computed on the positive samples in the validation set as a function of the same classifier threshold $\Theta_q$. The estimated parasitemia is then computed using equation 10 as:

$$\hat{p} = \frac{N_q - \overline{FPR}}{\overline{SNS}} \qquad \text{Eq. 10}$$

where $N_a$ is the number of candidate objects with classifier score above the threshold $\Theta_q$. It is understood that $\hat{p}$ is a function of the object classifier score threshold $\Theta_q$. The classifier score threshold $\Theta_q$ is determined by optimizing a given objective, such as mean square parasitemia error, across the validation set.

F. System Hardware

Figure 12:
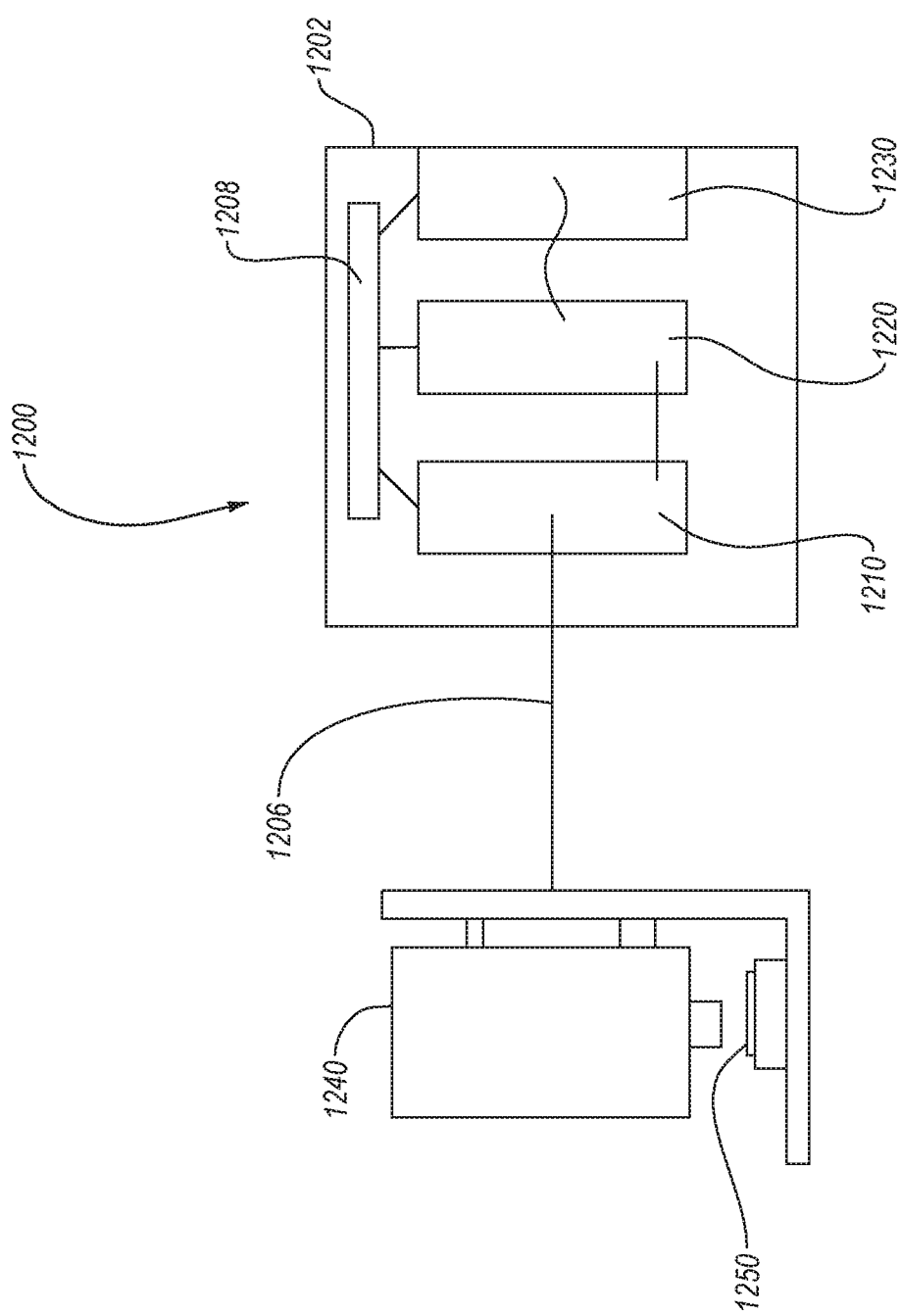
FIG. 12 is a schematic of a system for determining a presence of an analyte in a sample, according to an embodiment

FIG. 12 is a schematic of a system 1200 for determining the presence of an analyte in a sample, according to an embodiment. In some embodiments, the system 1200 can be configured to perform one or more of any of the algorithms or other operations disclosed herein. The system can include a computing device 1202. In some embodiments, the computing device 1202 can include at least one memory storage medium 1210 and at least one processor 1220. In some embodiments, the computing device 1202 can include a user interface 1230. The system 1200 can include an imaging device 1240 operably coupled thereto. Aspects of system components are described in more detail below.

In some embodiments, the computing device 1202 can include one or more of a personal computer, a network of computers, one or more servers, a laptop computer, a tablet computer, or a cellular phone. In some embodiments, one or more components of the computing device 1202 can be integrated into a microscope (imaging device). In some embodiments, one or more components of the computing device can be located remotely from the imaging device. In such embodiments, the one or more components of the computing device 1202 can be operably coupled to the imaging device 1240 through a wired or wireless connection 1206. In some embodiments, the one or more components of the computing device can be configured to receive images captured by the imaging device indirectly, such as through a disc, flash drive, e-mail, or other means.

The at least one memory storage medium 1210 can include one or more of a hard drive, a solid state drive, a disc, or any other tangible, non-transitory memory storage device. The at least one memory storage medium 1210 can include any of the modules or submodules disclosed herein as machine-readable and executable program stored thereon. In some embodiments, the system 1200 can include a plurality of memory storage mediums 1210 each having one or more modules or submodules stored thereon.

The at least one processor 1220 can be configured to read and execute one or more programs stored in the at least one memory storage medium 1210. For example, the at least one processor 1220 can be configured to read and execute one or more of any of the modules or submodules disclosed herein. In some embodiments, the at least one processor 1220 can include a plurality of processors. In such embodiments, each of the plurality of processors can be configured to read and execute one or more modules or submodules stored on the at least one storage medium 1220. In some embodiments, each of a plurality of processors 1220 can be operably coupled to a corresponding one of a plurality of memory storage mediums 1220, and be dedicated to and configured to run only one of the modules or submodules herein.

In some embodiments, the user interface 1230 can include one or more of a display screen, a keyboard, a touch screen, one or more indicators (e.g., lights, buzzers, speakers, etc.), or one or more buttons (e.g., power or start buttons). In some embodiments, the user interface can be physically connected to the computing device. In some embodiments, the user interface 1230 can be configured to display output or input from any of the modules or submodules disclosed herein. For example, the user interface 1230 can be configured to display one or more of a diagnosis, parasitemia, or any data or images disclosed herein. In some embodiments, the user interface can be configured to accept input from a user, such as via a keyboard, USB port, etc. The user interface 1230 can be operably coupled to the computing device via a wired or wireless connection. In some embodiments, the user interface 1230 can be located remotely from the computing device 1202, such as on a computer, tablet computer, or cellular phone remote from the computing device 1202. In such embodiments, one or more of the modules can be performed remotely from the user interface 1202.

In some embodiments, the computing device 1202 can include a power source 1208. The power source 1208 can include one or more of a battery (e.g., lithium ion battery, a lead acid battery, a Nickel Cadmium battery, or any other suitable battery), a solar cell, or an electrical plug (e.g., wall plug). The power source 1208 can be operably coupled to and configured to provide power to any of the components of the system 1200.

The imaging device 1240 can include a microscope, such as a high power microscope including a digital image recorder thereon. The digital imaging device 1240 can be configured to hold a sample slide 1250 thereon. The digital imaging device 1240 can include a high power lens and a digital image recorder to capture one or more high resolution images of a sample slide. The one or more high resolution images can include images of one or more FoVs and images of one or more focal planes of each FoV of the sample slide 1250. The imaging device can be directly coupled (e.g., wired or wirelessly connected) or indirectly coupled (e.g., via a computer network) to the computing device (e.g., to one or more of the memory storage medium(s), processor(s), or user interface of the computing device). In such embodiments, the imaging device 1240 can be configured to output one or more sample images to the at least one memory storage medium 1210 or at least one processor 1220. In some embodiments, the imaging device 1240 can be configured to respond to one or more instructions from the computing device (or a component thereof such as the processor). In such embodiments, the imaging device 1240 can operate based at least in part on operating instructions stored in the at least one memory storage medium 1210 and executed by the at least one processor 1220. For example, the imaging device 1220 can change the distance between or number of focal planes or FoVs based at least in part on instructions from the computing device 1202.

Any of the individual modules or submodules disclosed herein can include or be applied using a machine learning device or computer as disclosed herein.

G. Methods of Diagnosing an Analyte

Figure 13:
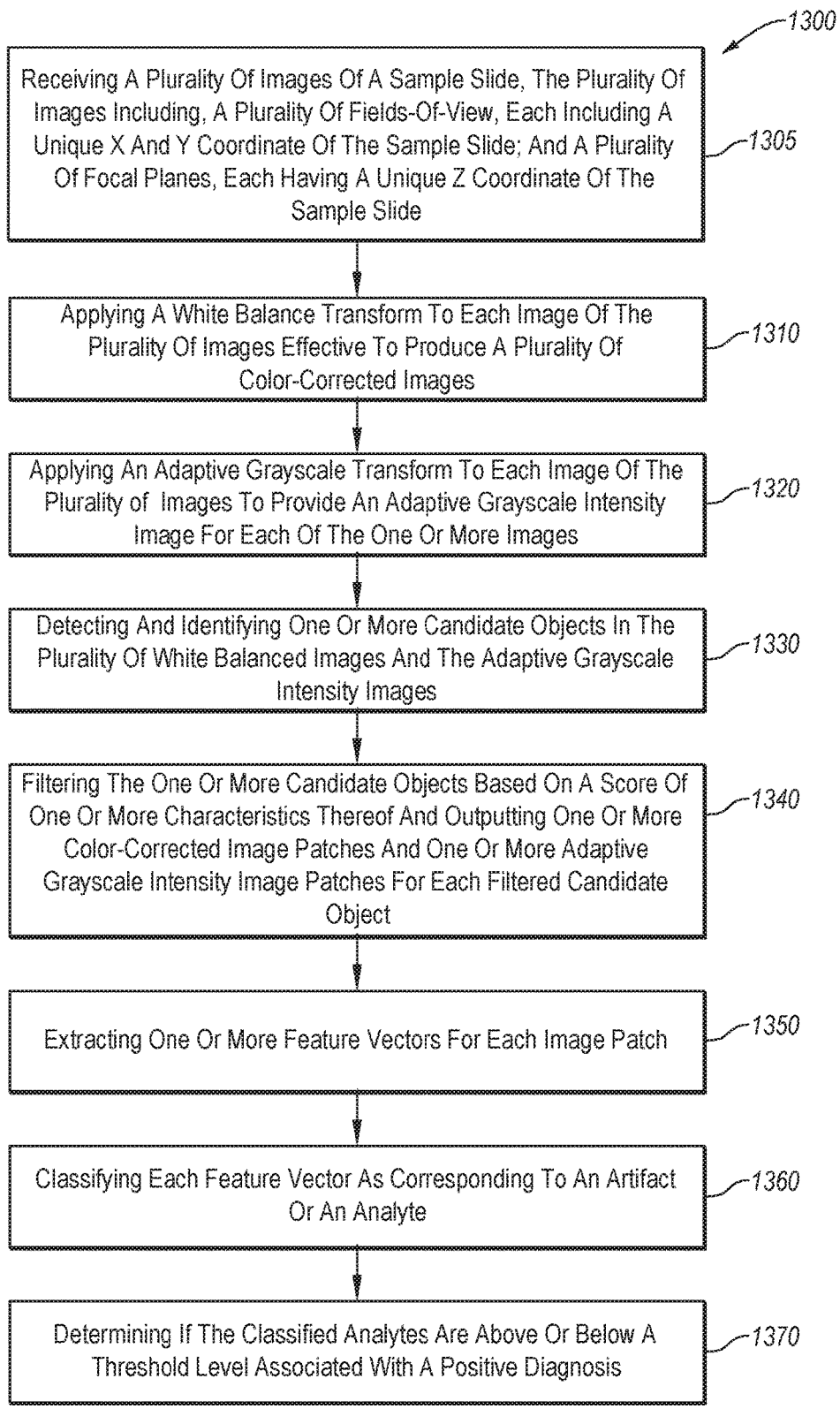
FIG. 13 is a flow diagram of a method for determining the presence of an analyte in a sample, according to an embodiment.

FIG. 13 is a flow diagram of a method 1300 for determining the presence of an analyte in a sample, according to an embodiment. Methods and individual acts for diagnosing an analyte in a sample are also described above with respect to each of the modules and submodules disclosed herein and, in the interest of brevity, are not repeated verbatim with respect to the method 1300. The method 1300 includes using a plurality of images of a sample slide to determine the presence of an analyte in a sample. The method 1300 can include an act 1305 of receiving a plurality of images of a sample slide, such as with a memory storage medium or processor. The plurality of images can include a plurality of FoVs, each including a unique x and y coordinate of the sample slide; and plurality of focal planes, each having a unique z coordinate of the sample slide. The method 1300 can include using one or more components of the system 1200 to perform any of the acts disclosed herein.

The method 1300 can include an act 1310 of applying a white balance transform to each image of the plurality of images effective to produce a plurality of color-corrected images. The method 1300 can include an act 1320 of applying an adaptive grayscale transform to each image of the plurality of images to provide an adaptive grayscale intensity image for each of the plurality of images. The method 1300 can include an act 1330 of detecting and identifying one or more candidate objects in the plurality of color-corrected (e.g., white-balanced) images and the adaptive grayscale intensity images. The method 1300 can include an act 1340 of filtering the one or more candidate objects based at least in part on a score of one or more characteristics thereof, and outputting one or more color-corrected image patches and one or more adaptive grayscale intensity image patches. The method 1300 can include an act 1350 of extracting one or more feature vectors from the color-corrected image patches and the adaptive grayscale intensity image patches and outputting the one or more feature vectors. The method 1300 can include an act 1360 of classifying each feature vector as corresponding to an artifact or an analyte. The method 1300 can include an act 1370 of determining if the classified feature vectors are above or below a threshold level associated with a positive diagnosis. Each of the acts 1310-1370 is discussed in more detail below.

The act 1310 of applying a white balance transform to each image of the plurality of images effective to produce a plurality of color-corrected images can be carried out using any of the techniques disclosed with respect to the image preprocessing module 310 disclosed above. For example, the act 1310 can include selecting a plurality of brightest pixels from a subset of the plurality of images selected such that the probability of the presence of a clear pixel being located in the subset approaches (is substantially) 1 as disclosed herein. The act 1310 can include calculating and applying a standard grayscale intensity of each pixel of the subset of images to determine the plurality of brightest pixels in each image of the subset of the plurality of images as disclosed herein. The act 1310 can include determining a red value R, a green value G, and a blue value B of each of the plurality of brightest pixels as disclosed herein. The act 1310 can include calculating an average color vector defined by an average color of the plurality of brightest pixels as disclosed herein. The act 1310 can include determining a white color vector and determining an axis vector that is perpendicular to, and calculated from the cross-product of both the average color vector and the white color vector. The act 1310 can in include computing an affine transform matrix from the axis vector and the angle between the white vector and the average color vector; and applying the affine transform matrix to each pixel in each image of the plurality of images to provide a plurality of color-corrected images.

The act 1320 of applying an adaptive grayscale transform to each image of the plurality of images to provide an adaptive grayscale intensity image for each of the plurality of image can be carried out using any of the techniques disclosed with respect to the image preprocessing module 310 disclosed above. For example, the act 1320 can include receiving as input a plurality of color-corrected images and standard grayscale intensity images and thresholding the standard grayscale intensity images at a dark threshold to detect blobs that may potentially be white blood cell nuclei. The act 1320 can include filtering the potential white blood cell nuclei blobs by attributes (e.g., color, area, or shape filters) to identify white blood cell nuclei as disclosed herein. The act 1320 can include outputting as white blood cell vector data a red value R, a green value G, and a blue value B of one or more pixels from the input color-corrected images that contain a while blood cell nuclei therein. The act 1320 can include outputting as background vector data, a red value R, a green value G, and a blue value B of a plurality of qualified background pixels as determined from a random sampling of pixels that are brighter in grayscale intensity than the dark threshold, in the color-corrected images. The act 1320 can include determining an adaptive grayscale projection vector from the white blood cell vector data and background vector data. The act 1320 can include outputting a plurality of adaptive grayscale intensity images.

The act 1330 of detecting and identifying one or more candidate objects in the plurality of color-corrected images and the adaptive grayscale intensity images can be carried out using any of the techniques disclosed with respect to the candidate object detection module 320 disclosed above. For example, detecting and identifying one or more candidate objects can include determining one or more potential analyte locations based upon one or more of a plurality of color-corrected images or a plurality of adaptive grayscale intensity images. The act 1330 can include determining which FoVs of the plurality of FoVs include one or more candidate objects therein. The act 1330 can include clustering of the one or more candidate objects therein to provide a candidate object cluster defined by the adjacent (e.g., nearby or overlapping) candidate objects therein. Clustering is based at least in part on the proximity or distance between candidate objects. The act 1330 can include determining the focal plane having a best focus score for each candidate object of the one or more candidate objects, as disclosed herein.

The act 1340 of filtering the one or more candidate objects based at least in part on a score of one or more characteristics thereof, and outputting one or more color-corrected image patches and one or more adaptive grayscale intensity image patches can be carried out using any of the techniques disclosed with respect to the candidate object detection module 320 disclosed above. The act 1340 can include outputting a score of one or more characteristics of each of the one or more candidate objects, the one or more characteristics including at least one of area, grayscale intensity, shape, or color. The act 1340 can include filtering the candidate objects based at least in part on the score which is based at least in part on the one or more characteristics. Filtering the one or more candidate objects can include comparing the score based at least in part on one or more characteristics of the one or more candidate objects to a threshold score based at least in part on the one or more characteristics. Filtering the candidate objects can include outputting the one or more candidate objects with a score above the threshold score as potential analyte locations and rejecting the one or more candidate objects with a score below the threshold score. The act 1340 can include outputting adaptive grayscale and color-corrected image patches and associated focal planes having potential analyte locations therein.

The act 1350 of extracting one or more feature vectors from the color-corrected image patches and the adaptive grayscale intensity image patches and outputting the one or more feature vectors can be carried out using any of the techniques disclosed with respect to the feature extraction module 330 disclosed above. For example, the act 1350 can include receiving as input a plurality of color-corrected image patches and a plurality of adaptive grayscale intensity image patches corresponding to the one or more potential analyte locations in the plurality of images and outputting one or more feature vectors each representing a potential analyte. The act 1350 can include receiving the one or more color-corrected image patches and one or more adaptive grayscale intensity image patches and teaching the CNN a set of weights based at least in part on the one or more ground truth image patches. In some embodiments, teaching the set of weights includes augmenting one or more ground truth images (e.g., image patches) using a data augmentation scheme. The data augmentation scheme can include a random gamma correction of one or more of a red, green, blue, or grayscale intensity component of the ground truth image patches. In some embodiments, teaching a set of weights to a CNN may include accepting as ground truth one or more annotated images of the analyte in ground truth samples and one or more annotated images of artifacts in ground truth samples. The annotated images may include known analytes and artifacts configured to train the CNN to recognize characteristics of the same. In some embodiments, accepting as ground truth one or more annotated images of the analyte in ground truth samples and one or more annotated images of artifacts in ground truth sample can include teaching a machine learning classifier a set of weights based at least in part on the one or more ground truth image patches. The act 1350 can include determining and extracting one or more features (e.g., one or more of manual features or automatic features) of one or more candidate objects in the plurality of color-corrected images and the plurality of adaptive grayscale intensity images corresponding to the one or more potential analyte locations. The act 1350 can include representing the one or more extracted features as the one or more feature vectors.

The act 1360 of classifying each feature vector as corresponding to an artifact or an analyte can be carried out using any of the techniques disclosed with respect to the object classifier module 340 disclosed above. For example, the act 1360 can include receiving as input one or more feature vectors of candidate objects and classifying the one or more feature vectors as corresponding to one of the artifact or the analyte. The classifying can be carried out by scoring the feature vectors with a machine learning classifier that has been trained with a set of ground truth images or associated vectors as disclosed above, with high scores (e.g., high probabilities) being classified as the analyte and low scores (e.g., low probabilities) being classified as something other than the analyte, such as background or an artifact. In some embodiments, classifying the one or more feature vectors can include averaging the scores of the machine learning classifier over the feature vectors corresponding to augmented versions of each of the color-corrected image patches and the adaptive grayscale intensity image patches. In some embodiments, the method may include outputting one or more image patches containing candidate objects (e.g., classified as analyte or artifact) therein for examination by human users. Such image patches can be output to a user interface, such as a computer screen.

The act 1370 of determining if the classified feature vectors are above or below a threshold level associated with a positive diagnosis can be carried out using any of the techniques disclosed with respect to the diagnosis module 350 disclosed above. For example, determining if the classified analytes are above or below a threshold level associated with a positive diagnosis can include determining if the analyte is present and giving an indication of the presence or absence of the analyte based upon an amount of one or more feature vectors that are classified as the analyte, or a relation thereof to a threshold value or a background noise value. In an embodiment, the method 1300 can include outputting a diagnosis or analyte concentration, such as to the user interface (e.g., displaying the diagnosis of analyte concentration).

In some embodiments, the method 1300 can include an act of obtaining a sample from a subject, such as obtaining a blood sample. In some embodiments, the method 1300 can include smearing the sample on a sample slide. In some embodiments, the method 1300 can include taking a plurality of images of a sample slide. The plurality of (sample) images can include multiple FoVs and focal planes. In an embodiment, the method 1300 can include outputting the plurality of (sample) images from the image device. The method 1300 can include receiving the plurality of (sample) images at the computing device.

In some embodiments, the method 1300 can include determining the concentration or amount of analyte in a sample (e.g., parasitemia). In some embodiments, the analyte can include a parasite such as malaria, loa loa, borrelia, helminth, tuberculosis, trypanosomiasis, or any other parasite. In some embodiments, the systems and methods herein can be used to detect specific parasite (e.g., malaria) conformations or species based upon one or more characteristics thereof.

In simplified terms, a method of detecting an analyte in a sample can include accepting as ground truth a set of annotated images of an analyte (e.g., malaria parasites) in biological samples from a geographic location. The method can include accepting a set of uncharacterized images from an automated microscope device, the uncharacterized images obtained from biological samples taken in the geographic location. The method can include preprocessing the set of uncharacterized images to create a set of images with consistent color appearance. The method can include subjecting the set of images with consistent color appearance to a candidate location classification to generate a set of candidate object images. The method can further include subjecting the set of candidate object images to a parasite detection classification based in part on the ground truth to generate a set of labelled objects. The method can include subjecting the set of labelled objects to a segmentation analysis depicting structures (e.g., nucleus and cytoplasm) in each of the set of labelled objects. The method can include performing feature extraction analysis on each of the set of labelled objects. The method can further include classifying each of the labelled objects with a classifier score related to the probability of the analyte (e.g., malaria parasite) being present in each of the labelled objects. In some embodiments, the method 1300 can include importing ground truth data associated with one or more candidate parasite species from memory storage based at least in part on meta-data corresponding to one or more of a geographic location, season, or other criteria associated with a sample, and use the same to determine or identify a species, stage, or type of parasite in a sample as disclosed above.

The reader will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. The reader will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer can opt for a mainly hardware and/or firmware vehicle; alternatively, if flexibility is paramount, the implementer can opt for a mainly software implementation; or, yet again alternatively, the implementer can opt for some combination of hardware, software, and/or firmware. Hence, there are several possible vehicles by which the processes and/or devices and/or other technologies described herein can be effected, none of which is inherently superior to the other in that any vehicle to be utilized is a choice dependent upon the context in which the vehicle will be deployed and the specific concerns (e.g., speed, flexibility, or predictability) of the implementer, any of which can vary. The reader will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In an embodiment, several portions of the subject matter described herein can be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one skilled in the art in light of this disclosure. In addition, the reader will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, the various embodiments described herein can be implemented, individually and/or collectively, by various types of electro-mechanical systems having a wide range of electrical components such as hardware, software, firmware, or virtually any combination thereof; and a wide range of components that can impart mechanical force or motion such as rigid bodies, spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electro-mechanical systems include but are not limited to a variety of consumer electrical systems, as well as other systems such as motorized transport systems, factory automation systems, security systems, and communication/computing systems. Those skilled in the art will recognize that electro-mechanical as used herein is not necessarily limited to a system that has both electrical and mechanical actuation except as context can dictate otherwise.

In a general sense, the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). The subject matter described herein can be implemented in an analog or digital fashion or some combination thereof.

This disclosure has been made with reference to various example embodiments. However, those skilled in the art will recognize that changes and modifications can be made to the embodiments without departing from the scope of the present disclosure. For example, various operational steps, as well as components for carrying out operational steps, can be implemented in alternate ways depending upon the particular application or in consideration of any number of cost functions associated with the operation of the system; e.g., one or more of the steps can be deleted, modified, or combined with other steps.

Additionally, as will be appreciated by one of ordinary skill in the art, principles of the present disclosure, including components, can be reflected in a computer program product on a computer-readable storage medium having computer-readable program code means embodied in the storage medium. Any tangible, non-transitory computer-readable storage medium can be utilized, including magnetic storage devices (hard disks, floppy disks, and the like), optical storage devices (CD-ROMs, DVDs, Blu-ray discs, and the like), flash memory, and/or the like. These computer program instructions can be loaded onto a general purpose computer, special purpose computer, or other programmable data processing apparatus to produce a machine, such that the instructions that execute on the computer or other programmable data processing apparatus create a means for implementing the functions specified. These computer program instructions can also be stored in a computer-readable memory that can direct a computer or other programmable data processing apparatus to function in a particular manner, such that the instructions stored in the computer-readable memory produce an article of manufacture, including implementing means that implement the function specified. The computer program instructions can also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified.

In an embodiment, the printing systems disclosed herein can be integrated in such a manner that the printing systems operate as a unique system configured specifically for function of printing (e.g., three-dimensional printing), and any associated computing devices of the printing systems operate as specific use computers for purposes of the claimed system, and not general use computers. In an embodiment, at least one associated computing device of the printing systems operates as specific use computers for purposes of the claimed system, and not general use computers. In an embodiment, at least one of the associated computing devices of the printing systems are hardwired with a specific ROM to instruct the at least one computing device. In an embodiment, one of skill in the art recognizes that the printing devices and printing systems effects an improvement at least in the technological field of three-dimensional printing.

The herein described components (e.g., steps), devices, and objects and the discussion accompanying them are used as examples for the sake of conceptual clarity. Consequently, as used herein, the specific exemplars set forth and the accompanying discussion are intended to be representative of their more general classes. In general, use of any specific exemplar herein is also intended to be representative of its class, and the non-inclusion of such specific components (e.g., steps), devices, and objects herein should not be taken as indicating that limitation is desired.

With respect to the use of substantially any plural and/or singular terms herein, the reader can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

In some instances, one or more components can be referred to herein as "configured to." The reader will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications can be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims. In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims can contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense the convention (e.g., "a system having at least one of A, B, or C" would include but not be limited to systems that have A alone, B alone, C alone, A and B together, A and C together, B and C together, and/or A, B, and C together, etc.).

Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

With respect to the appended claims, the recited operations therein can generally be performed in any order. Examples of such alternate orderings can include overlapping, interleaved, interrupted, reordered, incremental, preparatory, supplemental, simultaneous, reverse, or other variant orderings, unless context dictates otherwise. With respect to context, even terms like "responsive to," "related to," or other past-tense adjectives are generally not intended to exclude such variants, unless context dictates otherwise.

While various aspects and embodiments have been disclosed herein, the various aspects and embodiments disclosed herein are for purposes of illustration and are not intended to be limiting, with the true scope and spirit being indicated by the following claims.

What is claimed is:

1. A system for determining a presence of an analyte in blood, the system comprising:
   at least one memory storage medium configured to store a plurality of images of a sample slide, the plurality of images including,
      a plurality of fields-of-view, each including a unique x and y coordinate of the sample slide; and
      a plurality of focal planes, each having a unique z coordinate of the sample slide;
   at least one processor operably coupled to the at least one memory storage medium, the at least one processor being configured to,
      determine and apply a white balance transform to each of the plurality of images effective to produce a plurality of color-corrected images;
      determine and apply an adaptive grayscale transform to each of the plurality of images to provide an adaptive grayscale intensity image for each of the plurality of images;
      detect and identify one or more candidate objects in the plurality of color-corrected images and the adaptive grayscale intensity images;
      extract and score the one or more candidate objects based at least in part on one or more characteristics of the one or more candidate objects, filter the one or more candidate objects based at least in part on the score, and output one or more color-corrected image patches and one or more adaptive grayscale intensity image patches for each filtered candidate object;
      extract one or more feature vectors from the color-corrected image patches and the adaptive grayscale intensity image patches and output the one or more feature vectors;
      classify each of the one or more feature vectors as corresponding to an artifact or an analyte; and
      determine if the feature vectors classified as analytes are above or below a threshold level associated with a positive diagnosis.

2. The system of claim 1, wherein the at least one memory storage medium includes an image preprocessing module, a candidate object detection module, a feature extraction module, a classification module, and a diagnosis module stored therein as computer readable programs that are executable by the at least one processor.

3. The system of claim 1, wherein the at least one processor is configured to determine and apply a white balance transform to the plurality of images based at least partially upon a plurality of brightest pixels in the plurality of images.

4. The system of claim 3, wherein at least one processor is configured to determine the white balance transform from:
   a plurality of brightest pixels from a subset of the plurality of images randomly selected such that a probability of a presence of a clear pixel therein is substantially 1;
   a calculated standard grayscale intensity of each pixel of the subset of the plurality of images to determine the plurality of brightest pixels in each of the subset of the plurality of images;
   a red value R, a green value G, and a blue value B of each of the plurality of brightest pixels;
   an average color vector defined by an average color of the plurality of brightest pixels;
   a white color vector;
   an axis vector that is perpendicular to, and calculated from a cross-product of, both the average color vector and the white color vector; and
   an affine transform matrix calculated from the axis vector and an angle between the average color vector and the white color vector.

5. The system of claim 4, wherein the at least one processor is configured to apply the white balance transform to a color vector of each of the pixels of the plurality of images defined by the R, G, and B value therein, and output the color-corrected images based thereon.

6. The system of claim 1, wherein the at least one processor is configured to determine and apply an adaptive grayscale transform to the plurality of images and output a plurality of adaptive grayscale intensity images.

7. The system of claim 1, wherein at least one processor is configured to:
   receive as input a plurality of color-corrected images and standard grayscale intensity images;
   threshold the standard grayscale intensity images at a dark threshold to detect blobs;
   filter at least one of color, area, or shape of one or more detected blobs to locate and identify white blood cell nuclei at high sensitivity and specificity;
   output as white blood cell vector data to the memory storage medium, a red value R, a green value G, and a blue value B of one or more pixels from the color-corrected images that contain a white blood cell nuclei therein; and
   output as background vector data, to the memory storage medium, a red value R, a green value G, and a blue value B of a plurality of qualified background pixels as determined from a random sampling of pixels that are brighter in grayscale intensity than the dark threshold in the color-corrected images; and
   supply the white blood cell vector data and background vector data to a machine learning module stored in the at least one memory storage medium and executed by the at least one processor, the machine learning module configured to determine an adaptive grayscale projection vector.

8. The system of claim 7, wherein the at least one processor is configured to determine:
   the adaptive grayscale transform based upon an adaptive grayscale projection vector, which is based at least in part on a plurality of white blood cell pixels and a plurality of qualified background pixels; and the adaptive grayscale projection vector using a regression.

9. The system of claim 8, wherein the at least one processor is configured to calculate and apply an adaptive grayscale intensity to each of the plurality of images effective to provide a plurality of adaptive grayscale intensity images.

10. The system of claim 1, wherein the at least one processor is configured to determine one or more potential analyte locations based upon one or more of a plurality of color-corrected images or a plurality of adaptive grayscale intensity images.

11. The system of claim 10, wherein the at least one processor is configured to:
    determine which fields-of-view of the plurality of fields-of-view include one or more candidate objects therein;
    cluster candidate objects based at least in part on a distance between one or more adjacent candidate objects of the one or more candidate objects in a field-of-view to provide a candidate object cluster defined by one or more adjacent candidate objects therein;
    determine a focal plane having a best focus score for each of the one or more candidate objects;
    output a score for each of the one or more candidate object based at least in part on one or more characteristics of each of the one or more candidate objects, the one or more characteristics including at least one of area, grayscale intensity, shape, or color; and
    filter the one or more candidate objects based at least in part on the score of the one or more characteristics.

12. The system of claim 11, wherein the at least one processor is configured to filter the one or more candidate objects by comparing the score of one or more characteristics of the one or more candidate objects to a threshold score for each of the one or more characteristics, output the one or more candidate objects with a score above the threshold score as potential analyte locations, and reject the one or more candidate objects with a score below the threshold score.

13. The system of claim 12 wherein the at least one processor is configured to determine a threshold score based upon attributes of ground truth objects trained into the at least one memory storage medium and accessed by the at least one processor.

14. The system of claim 1, wherein the at least one processor is configured to receive as input a plurality of color-corrected image patches and a plurality of adaptive grayscale intensity image patches corresponding to the one or more potential analyte locations in the plurality of images and output one or more feature vectors each representing a potential analyte.

15. The system of claim 14, wherein the at least one processor is configured to determine and extract one or more manual features of the one or more candidate objects by determining one or more of,
    a best focal plane for each image patch of a plurality of color-corrected image patches and adaptive grayscale intensity image patches containing the one or more candidate objects, the best focus score including a highest score from a plurality of focus scores for the plurality of focal planes in an image patch having the one or more candidate objects therein;
    a standard deviation or other measure of dispersion of focus scores across all of the plurality of focal planes of an image patch having the one or more candidate objects therein; and
    a red-shift score of each image patch based at least partially upon a shift in redness of a darkest portion of the one or more candidate objects between the plurality of focal planes in each image patch.

16. The system of claim 1, wherein the at least one processor is configured to determine and extract one or more features of one or more candidate objects in the plurality of images and represent the one or more features as one or more feature vectors.

17. The system of claim 1, wherein the at least one processor is configured to receive as input one or more feature vectors of the one or more candidate objects and classify the one or more feature vectors as corresponding to one of the artifact or the analyte.

18. The system of claim 17, wherein the at least one processor is configured as a machine learning classifier that outputs a score indicating that each of the one or more feature vectors of the one or more candidate objects corresponds to an analyte.

19. The system of claim 17, wherein the at least one memory storage medium and at least one processor includes a machine learning classifier configured to learn based at least in part on the one or more ground truth image patches.

20. The system of claim 1, wherein the at least one processor is configured to determine if an analyte is present and give an indication of the presence or absence of the analyte.

21. The system of claim 20, wherein the analyte includes a parasite.

22. The system of claim 21, wherein the parasite includes a malaria parasite.

23. The system of claim 1, wherein the system includes an image capture device.

24. The system of claim 23, wherein the image capture device includes a microscope.

25. A method for determining a presence of an analyte in blood, the method comprising:
    receiving a plurality of images of a sample slide, the plurality of images including,
        a plurality of fields-of-view, each including a unique x and y coordinate of the sample slide; and
        a plurality of focal planes, each having a unique z coordinate of the sample slide;
    applying a white balance transform to each of the plurality of images effective to produce a plurality of color-corrected images; and
    applying an adaptive grayscale transform to each of the plurality of images to provide an adaptive grayscale intensity image for each of the plurality of images;
    detecting and identifying one or more candidate objects in the plurality of color-corrected images and the adaptive grayscale intensity images;
    filtering the one or more candidate objects based at least in part on a score that is based at least in part on one or more characteristics thereof and outputting one or more color-corrected image patches and one or more adaptive grayscale intensity image patches for each filtered candidate object;
    extracting one or more feature vectors from the color-corrected image patches and the adaptive grayscale intensity image patches and outputting the one or more feature vectors;
    classifying each feature vector as corresponding to an artifact or an analyte; and
    determining if the feature vectors classified as analytes are above or below a threshold level associated with a positive diagnosis.

26. The method of claim 25, wherein applying a white balance transform to the plurality of images includes using a plurality of brightest pixels in the plurality of images.

27. The method of claim 26, wherein applying a white balance transform includes determining the white balance transform including,
selecting a plurality of brightest pixels from a subset of the plurality of images randomly selected such that a probability of a presence of a clear pixel therein is substantially 1;
calculating and applying a standard grayscale intensity of each pixel of the subset of the plurality of images to determine the plurality of brightest pixels in each of the subset of the plurality of images;
determining a red value R, a green value G, and a blue value B of each of the plurality of brightest pixels;
calculating an average color vector defined by an average color of the plurality of brightest pixels;
determining a white color vector;
determining an axis vector that is perpendicular to, and calculated from a cross-product of, both the average color vector and the white color vector; and
determining an affine transform matrix calculated from the axis vector and an angle between the average color vector and the white color vector.

28. The method of claim 27, wherein applying the white balance transform includes applying the white balance transform to a color vector of each pixel of the plurality of images defined by the red value R, green value G, and blue value B therein, and outputting the color-corrected images based thereon.

29. The method of claim 25, wherein applying an adaptive grayscale transform to the plurality of images includes outputting a plurality of adaptive grayscale intensity images.

30. The method of claim 29, wherein applying an adaptive grayscale transform includes:
receiving as input a plurality of color-corrected images and standard grayscale intensity images;
thresholding the standard grayscale intensity images at a dark threshold to detect one or more blobs;
filtering at least one of color, area, or shape of the detected one or more blobs to locate and identify white blood cell nuclei at high sensitivity and specificity;
outputting as white blood cell vector data a red value R, a green value G, and a blue value B of one or more pixels from the color-corrected images that contain a while blood cell nuclei therein;
outputting as background vector data, a red value R, a green value G, and a blue value B of a plurality of qualified background pixels as determined from a random sampling of pixels that are brighter in grayscale intensity than the dark threshold in the color-corrected images; and
determining an adaptive grayscale projection vector from the white blood cell vector data and background vector data.

31. The method of claim 29, wherein applying an adaptive grayscale transform includes determining and applying the adaptive grayscale projection as a vector using a plurality of white blood cell pixels, a plurality of qualified background pixels, and a regression.

32. The method of claim 31, wherein using a regression includes using one or more of a ridge regression, lasso regression, principal components regression, or partial least squares regression.

33. The method of claim 29, wherein applying an adaptive grayscale transform includes calculating and applying an adaptive grayscale intensity to each of the plurality of images effective to provide a plurality of adaptive grayscale intensity images.

34. The method of claim 29, wherein applying an adaptive grayscale transform includes calculating and applying a polynomial regression using a second order or higher order polynomial predictor variable matrix.

35. The method of claim 29, wherein applying an adaptive grayscale transform includes calculating and applying polynomial regression using a predictor variable matrix having rational functions of red values R, green values G, and blue values B.

36. The method of claim 25, wherein detecting and identifying one or more candidate objects includes determining one or more potential analyte locations based upon one or more of a plurality of color-corrected images or a plurality of adaptive grayscale intensity images.

37. The method of claim 25, wherein detecting and identifying one or more candidate objects includes:
determining which fields-of-view of the plurality of fields-of-view include one or more candidate objects therein;
clustering one or more candidate objects based at least in part on a distance between adjacent candidate objects of the one or more candidate objects in a field-of view to provide a candidate object cluster defined by the adjacent candidate objects therein;
determining the focal plane having a best focus score for each of the one or more candidate objects;
outputting a score based at least in part on one or more characteristics of each of the one or more candidate objects, the one or more characteristics including at least one of area, grayscale intensity, shape, or color; and
filtering the candidate objects based at least in part on the score of the one or more characteristics.

38. The method of claim 37, wherein filtering the candidate objects based at least in part on the score of the one or more characteristics includes determining a threshold score based upon attributes of ground truth objects trained into a memory storage medium and accessed by at least one processor.

39. The method of claim 37, wherein filtering the candidate objects includes:
filtering the one or more candidate objects by comparing the score of one or more characteristics of the one or more candidate objects to a threshold score for each of the one or more characteristics;
outputting the one or more candidate objects with a score above the threshold score as potential analyte locations, and
rejecting the one or more candidate objects with a score below the threshold score.

40. The method of claim 39, further comprising outputting color-corrected image patches and adaptive grayscale intensity image patches corresponding to one or more potential analyte locations.

41. The method of claim 25, wherein extracting the one or more feature vectors from the color-corrected image patches and the adaptive grayscale intensity image patches includes:
receiving as input a plurality of color-corrected image patches and a plurality of adaptive grayscale intensity image patches corresponding to one or more potential analyte locations in the plurality of images; and
outputting one or more feature vectors each representing a potential analyte.

42. The method of claim 41, wherein extracting the one or more feature vectors from the color-corrected image patches and the adaptive grayscale intensity image patches includes:
- determining and extracting one or more features of one or more candidate objects in the plurality of color-corrected image patches and the plurality of adaptive grayscale intensity image patches corresponding to the one or more potential analyte locations; and
- representing one or more features associated with the one or more candidate objects as one or more feature vectors.

43. The method of claim 41, wherein extracting the one or more feature vectors from the color-corrected image patches and the adaptive grayscale intensity image patches includes:
- determining a best focus plane for each image patch of a plurality of color-corrected image patches and adaptive grayscale intensity image patches containing the candidate objects based at least in part on a best focus score, the best focus score including a highest score from a plurality of focus scores for the plurality of focal planes in an image patch having a candidate object therein;
- determining a standard deviation of focus scores across all of the plurality of focal planes of each image patch having the candidate object therein; and
- determining a red-shift score for each image patch based at least in part upon a shift in redness of a darkest portion of a candidate object between the plurality of focal planes in each image patch.

44. The method of claim 25, wherein classifying each feature vector as corresponding to an artifact or an analyte includes receiving as input one or more feature vectors of candidate objects and classifying the one or more feature vectors as corresponding to one of the artifact or the analyte.

45. The method of claim 44, wherein classifying each feature vector as corresponding to an artifact or an analyte includes using a machine learning classifier that outputs a score indicating that each of the one or more feature vectors of the one or more candidate objects corresponds to an analyte.

46. The method of claim 25, further comprising accepting as ground truth one or more annotated images of the analyte in ground truth samples and one or more annotated images of artifacts in ground truth samples.

47. The method of claim 46, wherein accepting as ground truth one or more annotated images of the analyte in ground truth samples and one or more annotated images of artifacts in ground truth samples includes teaching a machine learning classifier a set of weights based at least in part on the one or more learned ground truth image patches.

48. The method of claim 47, wherein the machine learning classifier includes a convolutional neural network and teaching the machine learning classifier a set of weights based at least in part on the one or more ground truth image patches includes loading the one or more annotated images of the analyte in ground truth samples and the one or more annotated images of artifacts in ground truth samples into the convolutional neural network.

49. The method of claim 48, wherein teaching the machine learning classifier a set of weights based at least in part on the one or more ground truth image patches includes augmenting the ground truth image patches using a data augmentation scheme.

50. The method of claim 25, wherein determining if the feature vectors classified corresponding to analytes are above or below a threshold level associated with a positive diagnosis includes determining if the analyte is present and giving an indication of a presence or absence of the analyte based upon an amount of one or more feature vectors as classified as the analyte.

51. The method of claim 25, further comprising identifying a species of one or more candidate objects based at least in part on one or more image characteristics including one or more of shape, size, or color.

52. The method of claim 25, further comprising recording, with a microscope, one or more images of one or more sample slides.

53. An automated system for determining a presence of a malaria parasite in blood, the system comprising:
- a microscope configured to capture a plurality of images of a blood slide, each of the plurality of images including,
  - a plurality of fields-of-view, each including a unique x and y coordinate of the blood slide; and
  - a plurality of focal planes, each having a unique z coordinate of the blood slide;
- at least one memory storage medium configured to store the plurality of images of the blood slide;
- at least one processor operably coupled to the at least one memory storage medium, the at least one processor being configured to,
  - determine and apply a white balance transform to each of the plurality of images effective to produce a plurality of color-corrected images; and
  - determine and apply an adaptive grayscale transform to each of the plurality of images to provide an adaptive grayscale intensity image for each of the plurality of images;
  - detect and identify one or more candidate objects in the plurality of color-corrected images and the adaptive grayscale intensity images;
  - extract and score one or more characteristics of the one or more candidate objects, filter the one or more candidate objects based at least in part on the score;
  - extract color-corrected image patches and adaptive grayscale intensity image patches of the one or more filtered candidate objects;
  - output one or more feature vectors for each filtered candidate object;
  - classify each feature vector as an artifact or an analyte; and
  - determine if the feature vectors classified as analytes are above or below a threshold level associated with a positive diagnosis.

* * * * *

UNITED STATES PATENT AND TRADEMARK OFFICE
CERTIFICATE OF CORRECTION

| | |
|---|---|
| PATENT NO. | : 9,836,839 B2 |
| APPLICATION NO. | : 15/154824 |
| DATED | : December 5, 2017 |
| INVENTOR(S) | : Cary Richard Champlin et al. |

Page 1 of 1

It is certified that error appears in the above-identified patent and that said Letters Patent is hereby corrected as shown below:

In the Claims

Column 37, Claim 30, Line 47:
"while blood cell nuclei therein;" should read --white blood cell nuclei therein;--

Signed and Sealed this
Nineteenth Day of June, 2018

Andrei Iancu
*Director of the United States Patent and Trademark Office*